(12) United States Patent
Nair

(10) Patent No.: US 12,125,017 B2
(45) Date of Patent: Oct. 22, 2024

(54) METHOD, SYSTEM, AND COMPUTER PROGRAM PRODUCT FOR GENERATING A PAYMENT DEVICE USING A VIRTUAL ENVIRONMENT

(71) Applicant: Visa International Service Association, San Francisco, CA (US)

(72) Inventor: Govind Ramachandran Nair, Mumbai (IN)

(73) Assignee: Visa International Service Association, San Francisco, CA (US)

( * ) Notice: Subject to any disclaimer, the term of this patent is extended or adjusted under 35 U.S.C. 154(b) by 75 days.

(21) Appl. No.: 18/115,225

(22) Filed: Feb. 28, 2023

(65) Prior Publication Data

US 2024/0289765 A1 Aug. 29, 2024

(51) Int. Cl.
| | |
|---|---|
| *G06Q 20/22* | (2012.01) |
| *G06F 3/01* | (2006.01) |
| *G06F 3/04815* | (2022.01) |
| *G06F 3/0482* | (2013.01) |
| *G06F 3/04845* | (2022.01) |
| *G06Q 20/30* | (2012.01) |

(52) U.S. Cl.
CPC .......... *G06Q 20/227* (2013.01); *G06F 3/012* (2013.01); *G06F 3/04815* (2013.01); *G06F 3/0482* (2013.01); *G06F 3/04845* (2013.01); *G06Q 20/30* (2013.01)

(58) Field of Classification Search
CPC ...... G06Q 20/227; G06Q 20/30; G06F 3/012; G06F 3/04815; G06F 3/0482; G06F 3/04845
See application file for complete search history.

(56) References Cited

U.S. PATENT DOCUMENTS

2013/0047217 A1\* 2/2013 Shuster ................. G06F 40/143
726/4
2023/0386144 A1\* 11/2023 Gudkov ................... G06N 3/08

\* cited by examiner

*Primary Examiner* — Scott S Trotter
(74) *Attorney, Agent, or Firm* — The Webb Law Firm

(57) ABSTRACT

A computer-implemented method includes: receiving user identifying data; launching a virtual environment including an interactive graphical user interface configured to receive user selection inputs; in the virtual environment: receiving a first user selection input selecting an avatar corresponding to a payment device reward; associating the avatar and the payment device reward with the user; displaying payment device design components; receiving a second user selection input selecting a payment device design component; and associating the payment device design component with the user; and redirecting the user to an issuer system by communicating a payment device issuance request to generate and issue a payment device to the user, where the payment device issuance request contains at least one of the following: the user data, the first user selection input, the second user selection input, and/or any combination thereof.

20 Claims, 11 Drawing Sheets

METHOD, SYSTEM, AND COMPUTER PROGRAM PRODUCT FOR GENERATING A PAYMENT DEVICE USING A VIRTUAL ENVIRONMENT

BACKGROUND

1. Field

This disclosure relates generally to virtual environments and, in non-limiting embodiments or aspects, to methods, systems, and computer program products for generating payment devices using a virtual environment.

2. Technical Considerations

Generating and issuing payment devices, such as credit cards or debit cards, commonly involves an application process during which a user applies for the payment device. If the user is approved during the application process, the user may receive the applied-for payment device. Existing systems used for the payment device application and issuance process can be confusing, mundane, and lacking in interactive components that enable users to seamlessly complete the application and issuance process. Improvements to computing systems used in the payment device application and issuance processes are desired.

SUMMARY

According to non-limiting embodiments or aspects, provided is a computer-implemented method that includes: receiving, with at least one computing device of a user, user data identifying the user; launching, with the at least one computing device, a virtual environment configured to interact with the user, where launching the virtual environment includes displaying an interactive graphical user interface configured to receive user selection inputs; in the virtual environment: receiving, with the interactive graphical user interface of the at least one computing device, a first user selection input selecting an avatar, the avatar corresponding to at least one payment device reward; associating, with the at least one computing device, the avatar with the user; associating, with the at least one computing device, the at least one payment device reward with the user; displaying, with the at least one computing device and on the interactive graphical user interface, a plurality of payment device design components; receiving, with the interactive graphical user interface of the at least one computing device, a second user selection input selecting at least one of the plurality of payment device design components; and associating, with the at least one computing device, the at least one of the plurality of payment device design components with the user; and redirecting, with the at least one computing device, the user to an issuer system by communicating a payment device issuance request to generate and issue a payment device to the user, where the payment device issuance request contains at least one of the following: the user data, the first user selection input, the second user selection input, and/or any combination thereof.

In non-limiting embodiments or aspects, the at least one computing device may include at least one of a smartphone, a desktop, a laptop, a virtual reality headset, a kiosk, and/or any combination thereof.

In non-limiting embodiments or aspects, the at least one computing device may include a virtual reality headset wearable by the user, where the virtual reality headset may be configured to detect a direction faced by the user such that a first region of the virtual environment may be displayed on the interactive graphical user interface when the user faces a first direction and a second region of the virtual environment may be displayed on the interactive graphical user interface when the user faces a second direction.

In non-limiting embodiments or aspects, the virtual environment may include a fully-immersive virtual environment, such that a region of the virtual environment may be displayed on the interactive graphical user interface for any direction faced by the user.

In non-limiting embodiments or aspects, a motion of the user detected by the at least one computing device may cause a component displayed by the interactive graphical user interface to move on the graphical user interface.

In non-limiting embodiments or aspects, the motion of the user detected by the at least one computing device may include a hand motion of the user.

In non-limiting embodiments or aspects, the first user selection input and/or the second user selection input may include a predetermined motion of the user and/or user selection of a selectable element displayed on the interactive graphical user interface.

In non-limiting embodiments or aspects, generating the payment device may include manufacturing, by the issuer system, a physical payment device, where the physical payment device may include the at least one of the plurality of payment device design components associated with the user and comprises data associated with the at least one payment device reward associated with the user.

In non-limiting embodiments or aspects, the plurality of payment device design components may include at least one of a payment device graphic design, a payment device orientation, a payment device material, and/or any combination thereof.

In non-limiting embodiments or aspects, a plurality of avatars may be displayed, where each avatar may correspond to a different payment device reward, where the plurality of avatars may include a first avatar associated with a first reward associated with a first class of goods/services and not a second class of goods/services and a second avatar associated with a second reward associated with the second class of goods/services and not the first class of goods/services.

In non-limiting embodiments or aspects, the computer-implemented method may further include: based on the selected avatar, displaying, with the at least one computing device and on the interactive graphical user interface, a plurality of payment device rewards corresponding to the selected avatar; and receiving, with the interactive graphical user interface of the at least one computing device, a third user selection input selecting at least one of the plurality of payment device rewards corresponding to the selected avatar.

In non-limiting embodiments or aspects, the computer-implemented method may further include: displaying, with the at least one computing device and on the interactive graphical user interface, a plurality of add-on rewards different from the at least one payment device reward associated with the user; receiving, with the interactive graphical user interface of the at least one computing device, a fourth user selection input selecting at least one add-on reward of the plurality of add-on rewards; and associating, with the at least one computing device, the at least one selected add-on reward with the user.

In non-limiting embodiments or aspects, the user data identifying the user may include historical transaction data associated with the user, and the computer-implemented method may further include: generating, with the at least one computing device, a recommendation for the user of the avatar and/or the at least one payment device reward based on the historical transaction data associated with the user; and displaying, with the at least one computing device and on the interactive graphical user interface, the recommendation of the avatar and/or the at least one payment device reward.

In non-limiting embodiments or aspects, the computer-implemented method may further include: displaying, with the at least one computing device, a plurality of virtual environment design options, each virtual environment design option corresponding to a different virtual environment design; receiving, with the at least one computing device, a fifth user selection input selecting a virtual environment design option of the plurality of virtual environment design options; and launching, with the at least one computing device, the virtual environment according the virtual environment design corresponding to the selected virtual environment design option.

In non-limiting embodiments or aspects, the virtual environment may be launched in response to a user selecting an interactive element in at least one of a virtual gaming environment, virtual concert environment, and/or virtual shopping environment in which the user is immersed.

In non-limiting embodiments or aspects, the virtual environment may be launched in response to a user engaging with the at least one computing device at a physical merchant location.

According to non-limiting embodiments or aspects, provided is a system including at least one processor of at least one computing device of a user, programmed or configured to: receive user data identifying the user; launch a virtual environment configured to interact with the user, where launching the virtual environment includes displaying an interactive graphical user interface of the at least one computing device, the interactive graphical user interface configured to receive user selection inputs; in the virtual environment: receive, with the interactive graphical user interface, a first user selection input selecting an avatar, the avatar corresponding to at least one payment device reward; associate the avatar with the user; associate the at least one payment device reward with the user; display, on the interactive graphical user interface, a plurality of payment device design components; receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, where the payment device issuance request contains at least one of the following: the user data, the first user selection input, the second user selection input, and/or any combination thereof.

In non-limiting embodiments or aspects, the at least one computing device may include at least one of a smartphone, a desktop, a laptop, a virtual reality headset, a kiosk, and/or any combination thereof.

In non-limiting embodiments or aspects, the at least one computing device may include a virtual reality headset wearable by the user, where the virtual reality headset may be configured to detect a direction faced by the user such that a first region of the virtual environment may be displayed on the interactive graphical user interface when the user faces a first direction and a second region of the virtual environment may be displayed on the interactive graphical user interface when the user faces a second direction.

In non-limiting embodiments or aspects, the virtual environment may include a fully-immersive virtual environment, such that a region of the virtual environment may be displayed on the interactive graphical user interface for any direction faced by the user.

In non-limiting embodiments or aspects, a motion of the user detected by the at least one computing device may cause a component displayed by the interactive graphical user interface to move on the graphical user interface.

In non-limiting embodiments or aspects, the motion of the user detected by the at least one computing device may include a hand motion of the user.

In non-limiting embodiments or aspects, the first user selection input and/or the second user selection input may include a predetermined motion of the user and/or user selection of a selectable element displayed on the interactive graphical user interface.

In non-limiting embodiments or aspects, the system may further include the issuer system, where generating the payment device may include manufacturing, by the issuer system, a physical payment device, where the physical payment device may include the at least one of the plurality of payment device design components associated with the user and includes data associated with the at least one payment device reward associated with the user.

In non-limiting embodiments or aspects, the plurality of payment device design components may include at least one of a payment device graphic design, a payment device orientation, a payment device material, and/or any combination thereof.

In non-limiting embodiments or aspects, a plurality of avatars may be displayed, where each avatar may correspond to a different payment device reward, where the plurality of avatars may include a first avatar associated with a first reward associated with a first class of goods/services and not a second class of goods/services and a second avatar associated with a second reward associated with the second class of goods/services and not the first class of goods/services.

In non-limiting embodiments or aspects, the at least one processor may be further programmed or configured to: based on the selected avatar, display, on the interactive graphical user interface, a plurality of payment device rewards corresponding to the selected avatar; and receive, with the interactive graphical user interface, a third user selection input selecting at least one of the plurality of payment device rewards corresponding to the selected avatar.

In non-limiting embodiments or aspects, the at least one processor may be further programmed or configured to: display, on the interactive graphical user interface, a plurality of add-on rewards different from the at least one payment device reward associated with the user; receive, with the interactive graphical user interface, a fourth user selection input selecting at least one add-on reward of the plurality of add-on rewards; and associate the at least one selected add-on reward with the user.

In non-limiting embodiments or aspects, the user data identifying the user may include historical transaction data associated with the user, where the at least one processor may be further programmed or configured to: generate a recommendation for the user of the avatar and/or the at least one payment device reward based on the historical transaction data associated with the user; and display, on the interactive graphical user interface, the recommendation of the avatar and/or the at least one payment device reward.

In non-limiting embodiments or aspects, the at least one processor may be further programmed or configured to: display a plurality of virtual environment design options, each virtual environment design option corresponding to a different virtual environment design; receive a fifth user selection input selecting a virtual environment design option of the plurality of virtual environment design options; and launch the virtual environment according the virtual environment design corresponding to the selected virtual environment design option.

In non-limiting embodiments or aspects, the virtual environment may be launched in response to a user selecting an interactive element in at least one of a virtual gaming environment, virtual concert environment, and/or virtual shopping environment in which the user is immersed.

In non-limiting embodiments or aspects, the virtual environment may be launched in response to a user engaging with the at least one computing device at a physical merchant location.

According to non-limiting embodiments or aspects, provided is a computer program product including at least one non-transitory computer-readable medium including program instructions that, when executed by at least one processor of at least one computing device of a user, cause the at least one processor to: receive user data identifying the user; launch a virtual environment configured to interact with the user, wherein launching the virtual environment includes displaying an interactive graphical user interface of the at least one computing device, the interactive graphical user interface configured to receive user selection inputs; in the virtual environment: receive, with the interactive graphical user interface, a first user selection input selecting an avatar, the avatar corresponding to at least one payment device reward; associate the avatar with the user; associate the at least one payment device reward with the user; display, on the interactive graphical user interface, a plurality of payment device design components; receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, wherein the payment device issuance request contains at least one of the following: the user data, the first user selection input, the second user selection input, and/or any combination thereof.

In non-limiting embodiments or aspects, the at least one computing device may include at least one of a smartphone, a desktop, a laptop, a virtual reality headset, a kiosk, and/or any combination thereof.

In non-limiting embodiments or aspects, the at least one computing device may include a virtual reality headset wearable by the user, where the virtual reality headset may be configured to detect a direction faced by the user such that a first region of the virtual environment may be displayed on the interactive graphical user interface when the user faces a first direction and a second region of the virtual environment may be displayed on the interactive graphical user interface when the user faces a second direction.

In non-limiting embodiments or aspects, the virtual environment may include a fully-immersive virtual environment, such that a region of the virtual environment may be displayed on the interactive graphical user interface for any direction faced by the user.

In non-limiting embodiments or aspects, a motion of the user detected by the at least one computing device may cause a component displayed by the interactive graphical user interface to move on the graphical user interface.

In non-limiting embodiments or aspects, the motion of the user detected by the at least one computing device may include a hand motion of the user.

In non-limiting embodiments or aspects, the first user selection input and/or the second user selection input may include a predetermined motion of the user and/or user selection of a selectable element displayed on the interactive graphical user interface.

In non-limiting embodiments or aspects, the computer program product may further include program instructions that, when executed by at least one processor of the issuer system, cause the at least one processor of the issuer system to: generate the payment device by causing manufacturing, by the issuer system, of a physical payment device, where the physical payment device may include the at least one of the plurality of payment device design components associated with the user and includes data associated with the at least one payment device reward associated with the user.

In non-limiting embodiments or aspects, the plurality of payment device design components may include at least one of a payment device graphic design, a payment device orientation, a payment device material, and/or any combination thereof.

In non-limiting embodiments or aspects, a plurality of avatars may be displayed, where each avatar may correspond to a different payment device reward, where the plurality of avatars may include a first avatar associated with a first reward associated with a first class of goods/services and not a second class of goods/services and a second avatar associated with a second reward associated with the second class of goods/services and not the first class of goods/services.

In non-limiting embodiments or aspects, the program instructions may further cause the at least one processor to: based on the selected avatar, display, on the interactive graphical user interface, a plurality of payment device rewards corresponding to the selected avatar; and receive, with the interactive graphical user interface, a third user selection input selecting at least one of the plurality of payment device rewards corresponding to the selected avatar.

In non-limiting embodiments or aspects, the program instructions may further cause the at least one processor to: display, on the interactive graphical user interface, a plurality of add-on rewards different from the at least one payment device reward associated with the user; receive, with the interactive graphical user interface, a fourth user selection input selecting at least one add-on reward of the plurality of add-on rewards; and associate the at least one selected add-on reward with the user.

In non-limiting embodiments or aspects, the user data identifying the user may include historical transaction data associated with the user, where the program instructions may further cause the at least one processor to: generate a recommendation for the user of the avatar and/or the at least one payment device reward based on the historical transaction data associated with the user; and display, on the interactive graphical user interface, the recommendation of the avatar and/or the at least one payment device reward.

In non-limiting embodiments or aspects, the program instructions may further cause the at least one processor to: display a plurality of virtual environment design options, each virtual environment design option corresponding to a different virtual environment design; receive a fifth user selection input selecting a virtual environment design option of the plurality of virtual environment design options; and launch the virtual environment according the virtual environment design corresponding to the selected virtual environment design option.

In non-limiting embodiments or aspects, the virtual environment may be launched in response to a user selecting an interactive element in at least one of a virtual gaming environment, virtual concert environment, and/or virtual shopping environment in which the user is immersed.

In non-limiting embodiments or aspects, the virtual environment may be launched in response to a user engaging with the at least one computing device at a physical merchant location.

Other non-limiting embodiments or aspects will be set forth in the following numbered clauses:

Clause 1: A computer-implemented method, comprising: receiving, with at least one computing device of a user, user data identifying the user; launching, with the at least one computing device, a virtual environment configured to interact with the user, wherein launching the virtual environment comprises displaying an interactive graphical user interface configured to receive user selection inputs; in the virtual environment: receiving, with the interactive graphical user interface of the at least one computing device, a first user selection input selecting an avatar, the avatar corresponding to at least one payment device reward; associating, with the at least one computing device, the avatar with the user; associating, with the at least one computing device, the at least one payment device reward with the user; displaying, with the at least one computing device and on the interactive graphical user interface, a plurality of payment device design components; receiving, with the interactive graphical user interface of the at least one computing device, a second user selection input selecting at least one of the plurality of payment device design components; and associating, with the at least one computing device, the at least one of the plurality of payment device design components with the user; and redirecting, with the at least one computing device, the user to an issuer system by communicating a payment device issuance request to generate and issue a payment device to the user, wherein the payment device issuance request contains at least one of the following: the user data, the first user selection input, the second user selection input, and/or any combination thereof.

Clause 2: The computer-implemented method of clause 1, wherein the at least one computing device comprises at least one of a smartphone, a desktop, a laptop, a virtual reality headset, a kiosk, and/or any combination thereof.

Clause 3: The computer-implemented method of clause 1 or 2, wherein the at least one computing device comprises a virtual reality headset wearable by the user, wherein the virtual reality headset is configured to detect a direction faced by the user such that a first region of the virtual environment is displayed on the interactive graphical user interface when the user faces a first direction and a second region of the virtual environment is displayed on the interactive graphical user interface when the user faces a second direction.

Clause 4: The computer-implemented method of any of clauses 1-3, wherein the virtual environment comprises a fully-immersive virtual environment, such that a region of the virtual environment is displayed on the interactive graphical user interface for any direction faced by the user.

Clause 5: The computer-implemented method of any of clauses 1-4, wherein a motion of the user detected by the at least one computing device causes a component displayed by the interactive graphical user interface to move on the graphical user interface.

Clause 6: The computer-implemented method of any of clauses 1-5, wherein the motion of the user detected by the at least one computing device comprises a hand motion of the user.

Clause 7: The computer-implemented method of any of clauses 1-6, wherein the first user selection input and/or the second user selection input comprises a predetermined motion of the user and/or user selection of a selectable element displayed on the interactive graphical user interface.

Clause 8: The computer-implemented method of any of clauses 1-7, wherein generating the payment device comprises manufacturing, by the issuer system, a physical payment device, wherein the physical payment device comprises the at least one of the plurality of payment device design components associated with the user and comprises data associated with the at least one payment device reward associated with the user.

Clause 9: The computer-implemented method of any of clauses 1-8, wherein the plurality of payment device design components comprise at least one of a payment device graphic design, a payment device orientation, a payment device material, and/or any combination thereof.

Clause 10: The computer-implemented method of any of clauses 1-9, wherein a plurality of avatars are displayed, wherein each avatar corresponds to a different payment device reward, wherein the plurality of avatars comprise a first avatar associated with a first reward associated with a first class of goods/services and not a second class of goods/services and a second avatar associated with a second reward associated with the second class of goods/services and not the first class of goods/services.

Clause 11: The computer-implemented method of any of clauses 1-10, further comprising: based on the selected avatar, displaying, with the at least one computing device and on the interactive graphical user interface, a plurality of payment device rewards corresponding to the selected avatar; and receiving, with the interactive graphical user interface of the at least one computing device, a third user selection input selecting at least one of the plurality of payment device rewards corresponding to the selected avatar.

Clause 12: The computer-implemented method of any of clauses 1-11, further comprising: displaying, with the at least one computing device and on the interactive graphical user interface, a plurality of add-on rewards different from the at least one payment device reward associated with the user; receiving, with the interactive graphical user interface of the at least one computing device, a fourth user selection input selecting at least one add-on reward of the plurality of add-on rewards; and associating, with the at least one computing device, the at least one selected add-on reward with the user.

Clause 13: The computer-implemented method of any of clauses 1-12, wherein the user data identifying the user comprises historical transaction data associated with the user, the computer-implemented method further comprising: generating, with the at least one computing device, a recommendation for the user of the avatar and/or the at least one payment device reward based on the historical transaction data associated with the user; and displaying, with the at least one computing device and on the interactive graphical user interface, the recommendation of the avatar and/or the at least one payment device reward.

Clause 14: The computer-implemented method of any of clauses 1-13, further comprising: displaying, with the at least one computing device, a plurality of virtual environment design options, each virtual environment design option corresponding to a different virtual environment design; receiving, with the at least one computing device, a fifth user selection input selecting a virtual environment design option of the plurality of virtual environment design options; and launching, with the at least one computing device, the virtual environment according the virtual environment design corresponding to the selected virtual environment design option.

Clause 15: The computer-implemented method of any of clauses 1-14, wherein the virtual environment is launched in response to a user selecting an interactive element in at least one of a virtual gaming environment, virtual concert environment, and/or virtual shopping environment in which the user is immersed.

Clause 16: The computer-implemented method of any of clauses 1-15, wherein the virtual environment is launched in response to a user engaging with the at least one computing device at a physical merchant location.

Clause 17: A system comprising at least one processor of at least one computing device of a user, programmed or configured to: receive user data identifying the user; launch a virtual environment configured to interact with the user, wherein launching the virtual environment comprises displaying an interactive graphical user interface of the at least one computing device, the interactive graphical user interface configured to receive user selection inputs; in the virtual environment: receive, with the interactive graphical user interface, a first user selection input selecting an avatar, the avatar corresponding to at least one payment device reward; associate the avatar with the user; associate the at least one payment device reward with the user; display, on the interactive graphical user interface, a plurality of payment device design components; receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, wherein the payment device issuance request contains at least one of the following: the user data, the first user selection input, the second user selection input, and/or any combination thereof.

Clause 18: The system of clause 17, wherein the at least one computing device comprises at least one of a smartphone, a desktop, a laptop, a virtual reality headset, a kiosk, and/or any combination thereof.

Clause 19: The system of clause 17 or 18, wherein the at least one computing device comprises a virtual reality headset wearable by the user, wherein the virtual reality headset is configured to detect a direction faced by the user such that a first region of the virtual environment is displayed on the interactive graphical user interface when the user faces a first direction and a second region of the virtual environment is displayed on the interactive graphical user interface when the user faces a second direction.

Clause 20: The system of any of clauses 17-19, wherein the virtual environment comprises a fully-immersive virtual environment, such that a region of the virtual environment is displayed on the interactive graphical user interface for any direction faced by the user.

Clause 21: The system of any of clauses 17-20, wherein a motion of the user detected by the at least one computing device causes a component displayed by the interactive graphical user interface to move on the graphical user interface.

Clause 22: The system of any of clauses 17-21, wherein the motion of the user detected by the at least one computing device comprises a hand motion of the user.

Clause 23: The system of any of clauses 17-22, wherein the first user selection input and/or the second user selection input comprises a predetermined motion of the user and/or user selection of a selectable element displayed on the interactive graphical user interface.

Clause 24: The system of any of clauses 17-23, further comprising the issuer system, wherein generating the payment device comprises manufacturing, by the issuer system, a physical payment device, wherein the physical payment device comprises the at least one of the plurality of payment device design components associated with the user and comprises data associated with the at least one payment device reward associated with the user.

Clause 25: The system of any of clauses 17-24, wherein the plurality of payment device design components comprise at least one of a payment device graphic design, a payment device orientation, a payment device material, and/or any combination thereof.

Clause 26: The system of any of clauses 17-25, wherein a plurality of avatars are displayed, wherein each avatar corresponds to a different payment device reward, wherein the plurality of avatars comprise a first avatar associated with a first reward associated with a first class of goods/services and not a second class of goods/services and a second avatar associated with a second reward associated with the second class of goods/services and not the first class of goods/services.

Clause 27: The system of any of clauses 17-26, wherein the at least one processor is further programmed or configured to: based on the selected avatar, display, on the interactive graphical user interface, a plurality of payment device rewards corresponding to the selected avatar; and receive, with the interactive graphical user interface, a third user selection input selecting at least one of the plurality of payment device rewards corresponding to the selected avatar.

Clause 28: The system of any of clauses 17-27, wherein the at least one processor is further programmed or configured to: display, on the interactive graphical user interface, a plurality of add-on rewards different from the at least one payment device reward associated with the user; receive, with the interactive graphical user interface, a fourth user selection input selecting at least one add-on reward of the plurality of add-on rewards; and associate the at least one selected add-on reward with the user.

Clause 29: The system of any of clauses 17-28, wherein the user data identifying the user comprises historical transaction data associated with the user, wherein the at least one processor is further programmed or configured to: generate a recommendation for the user of the avatar and/or the at least one payment device reward based on the historical transaction data associated with the user; and display, on the interactive graphical user interface, the recommendation of the avatar and/or the at least one payment device reward.

Clause 30: The system of any of clauses 17-29, wherein the at least one processor is further programmed or configured to: display a plurality of virtual environment design options, each virtual environment design option corresponding to a different virtual environment design; receive a fifth user selection input selecting a virtual environment design option of the plurality of virtual environment design options;

and launch the virtual environment according the virtual environment design corresponding to the selected virtual environment design option.

Clause 31: The system of any of clauses 17-30, wherein the virtual environment is launched in response to a user selecting an interactive element in at least one of a virtual gaming environment, virtual concert environment, and/or virtual shopping environment in which the user is immersed.

Clause 32: The system of any of clauses 17-31, wherein the virtual environment is launched in response to a user engaging with the at least one computing device at a physical merchant location.

Clause 33: A computer program product comprising at least one non-transitory computer-readable medium including program instructions that, when executed by at least one processor of at least one computing device of a user, cause the at least one processor to: receive user data identifying the user; launch a virtual environment configured to interact with the user, wherein launching the virtual environment comprises displaying an interactive graphical user interface of the at least one computing device, the interactive graphical user interface configured to receive user selection inputs; in the virtual environment: receive, with the interactive graphical user interface, a first user selection input selecting an avatar, the avatar corresponding to at least one payment device reward; associate the avatar with the user; associate the at least one payment device reward with the user; display, on the interactive graphical user interface, a plurality of payment device design components; receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, wherein the payment device issuance request contains at least one of the following: the user data, the first user selection input, the second user selection input, and/or any combination thereof.

Clause 34: The computer program product of clause 33, wherein the at least one computing device comprises at least one of a smartphone, a desktop, a laptop, a virtual reality headset, a kiosk, and/or any combination thereof.

Clause 35: The computer program product of clause 33 or 34, wherein the at least one computing device comprises a virtual reality headset wearable by the user, wherein the virtual reality headset is configured to detect a direction faced by the user such that a first region of the virtual environment is displayed on the interactive graphical user interface when the user faces a first direction and a second region of the virtual environment is displayed on the interactive graphical user interface when the user faces a second direction.

Clause 36: The computer program product of any of clauses 33-35, wherein the virtual environment comprises a fully-immersive virtual environment, such that a region of the virtual environment is displayed on the interactive graphical user interface for any direction faced by the user.

Clause 37: The computer program product of any of clauses 33-36, wherein a motion of the user detected by the at least one computing device causes a component displayed by the interactive graphical user interface to move on the graphical user interface.

Clause 38: The computer program product of any of clauses 33-37, wherein the motion of the user detected by the at least one computing device comprises a hand motion of the user.

Clause 39: The computer program product of any of clauses 33-38, wherein the first user selection input and/or the second user selection input comprises a predetermined motion of the user and/or user selection of a selectable element displayed on the interactive graphical user interface.

Clause 40: The computer program product of any of clauses 33-39, further comprising program instructions that, when executed by at least one processor of the issuer system, cause the at least one processor of the issuer system to: generate the payment device by causing manufacturing, by the issuer system, of a physical payment device, wherein the physical payment device comprises the at least one of the plurality of payment device design components associated with the user and comprises data associated with the at least one payment device reward associated with the user.

Clause 41: The computer program product of any of clauses 33-40, wherein the plurality of payment device design components comprise at least one of a payment device graphic design, a payment device orientation, a payment device material, and/or any combination thereof.

Clause 42: The computer program product of any of clauses 33-41, wherein a plurality of avatars are displayed, wherein each avatar corresponds to a different payment device reward, wherein the plurality of avatars comprise a first avatar associated with a first reward associated with a first class of goods/services and not a second class of goods/services and a second avatar associated with a second reward associated with the second class of goods/services and not the first class of goods/services.

Clause 43: The computer program product of any of clauses 33-42, wherein the program instructions further cause the at least one processor to: based on the selected avatar, display, on the interactive graphical user interface, a plurality of payment device rewards corresponding to the selected avatar; and receive, with the interactive graphical user interface, a third user selection input selecting at least one of the plurality of payment device rewards corresponding to the selected avatar.

Clause 44: The computer program product of any of clauses 33-43, wherein the program instructions further cause the at least one processor to: display, on the interactive graphical user interface, a plurality of add-on rewards different from the at least one payment device reward associated with the user; receive, with the interactive graphical user interface, a fourth user selection input selecting at least one add-on reward of the plurality of add-on rewards; and associate the at least one selected add-on reward with the user.

Clause 45: The computer program product of any of clauses 33-44, wherein the user data identifying the user comprises historical transaction data associated with the user, wherein the program instructions further cause the at least one processor to: generate a recommendation for the user of the avatar and/or the at least one payment device reward based on the historical transaction data associated with the user; and display, on the interactive graphical user interface, the recommendation of the avatar and/or the at least one payment device reward.

Clause 46: The computer program product of any of clauses 33-45, wherein the program instructions further cause the at least one processor to: display a plurality of virtual environment design options, each virtual environment design option corresponding to a different virtual environment design; receive a fifth user selection input selecting a virtual environment design option of the plurality of virtual environment design options; and launch the virtual environment according the virtual environment design corresponding to the selected virtual environment design option.

Clause 47: The computer program product of any of clauses 33-46, wherein the virtual environment is launched in response to a user selecting an interactive element in at least one of a virtual gaming environment, virtual concert environment, and/or virtual shopping environment in which the user is immersed.

Clause 48: The computer program product of any of clauses 33-47, wherein the virtual environment is launched in response to a user engaging with the at least one computing device at a physical merchant location.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
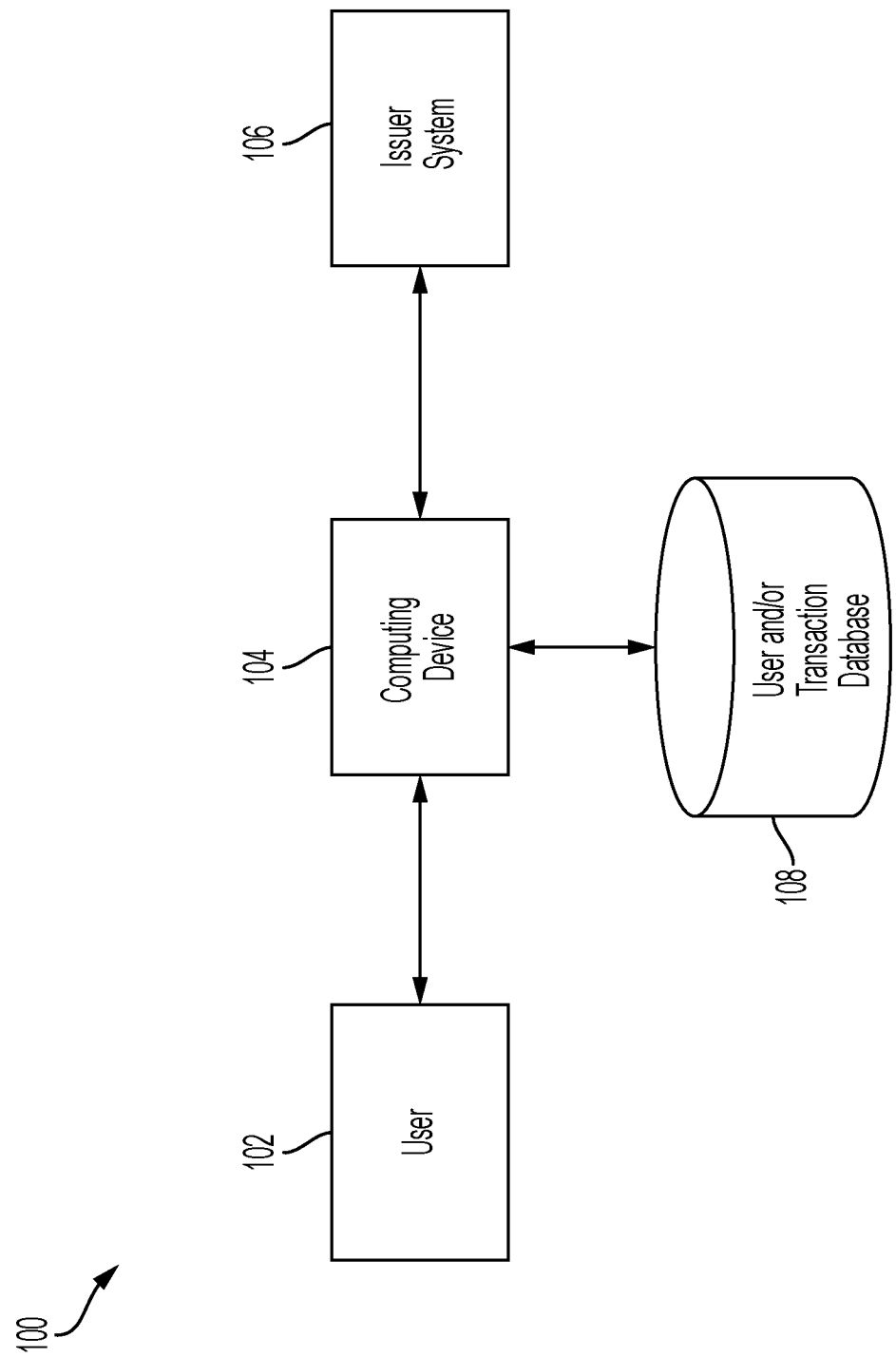
FIG. 1 is a schematic diagram of a system for generating a payment device using a virtual environment, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "account identifier" may include one or more primary account numbers (PAN), tokens, or other identifiers associated with a customer account. For example, account identifiers in Real Time Payment (RTP) transactions may include identifiers for sender accounts (called debtor accounts) and identifiers for receiver accounts (called creditor accounts). Account identifiers may be alphanumeric or any combination of characters and/or symbols. Tokens may be associated with a PAN, debtor account identifier, creditor account identifier, or other original account identifier in one or more data structures (e.g., one or more databases, and/or the like) such that they may be used to conduct a transaction without directly using the original account identifier. In some examples, an original account identifier may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" or "user device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a PAN, to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, the term "payment device" may refer to a payment card (e.g., a credit or debit card), a gift card, a smartcard, smart media, a payroll card, a healthcare card, a wristband, a machine-readable medium containing account information, a keychain device or fob, a radio frequency identification (RFID) transponder, a retailer discount or loyalty card, and/or the like. The payment device may include a volatile or a non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, RFID receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments, a POS system (e.g., a merchant POS system) may include one or more server computers programmed or configured to process online payment transactions through webpages, mobile applications, and/or the like.

The term "processor," as used herein, may represent any type of processing unit, such as a single processor having one or more cores, one or more cores of one or more processors, multiple processors each having one or more cores, and/or other arrangements and combinations of processing units. Reference to "at least one processor" can refer to a previously-recited processor or a different processor.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

As used herein, the term "virtual environment" may refer to an environment not existing in the physical world but made to appear by executing specialized software, such as any virtual reality (VR) and/or augmented reality (AR) environment, including but not limited to a "metaverse" environment, a gaming environment, and/or the like. The virtual environment may be accessed by a user through one or more computing devices, such as a VR or AR headset, mobile device, wearable device, VR or AR kiosk and/or the like. In some examples, the user may be represented by a pseudo-identity. The pseudo-identity may include an avatar, such as a graphical representation (e.g., an icon, image, picture, photograph, three-dimensional model, and/or the like) of a user in the virtual environment. In some examples the avatar may move within and interact with the virtual environment. The pseudo-identity may include a pseudonym, such as a handle, user name, or the like.

Non-limiting embodiments or aspects described herein relate to systems, methods, and computer program products for generating a payment device using a virtual environment. Non-limiting embodiments or aspects may launch a virtual environment on a computing device. The virtual environment may be configured to interact with the user via a displayed interactive graphical user interface configured to receive user selection inputs. The virtual environment may gamify the user experience associated with generating a payment device. Non-limiting embodiments or aspects may launch the virtual environment using a VR computing device that provides the user an immersive experience in the virtual environment. In the virtual environment, the user may interact with the user interface to make a plurality of user selections associated with various components of the customized payment device being generated. Upon completion of the interactive virtual environment experience, the user may be automatically redirected to an issuer system, which may generate and issue the customized payment device to the user. The user may receive a physical payment device manufactured specifically for the user according to the specifications selected by the user in the virtual environment. Generating the payment device in the virtual environment as described herein may allow for a high level of customization of the generated payment device, and the interactions with the virtual environment may enable users to seamlessly complete the application and issuance process. Further, non-limiting embodiments help retain users and keep users engaged in a process that is often interrupted or disrupted when being completed in a web browser, in person, or the like.

While described in the context of systems, methods, and computer program products for generating a payment device using a virtual environment, it will be appreciated that other devices may be generated using the virtual environment described herein. For example, the virtual environment may be used in the application process for financial instruments, such as loan applications, bank accounts, and the like. The virtual environment may be used in other application and/or registration processes that involve user selection and/or customization, such as membership application processes, license application processes, identification card application processes, goods and/or services customization and/or ordering processes, and the like.

Referring to FIG. 1, a system 100 is shown for generating a payment device using a virtual environment according to some non-limiting embodiments or aspects. The system 100 may include a computing device 104, an issuer system 106, and/or a user and/or transaction database 108 that is interacted with by a user 102.

In non-limiting embodiments or aspects, the computing device 104 may include at least one of a smartphone, a wearable device, a VR computing device, a kiosk, and/or any combination thereof. The computing device 104 may comprise a plugin configured to launch a virtual environment as described herein. The VR computing device may be any suitable computing device configured to display a partially or fully immersive virtual environment for the user 102, such as a VR computing device that comprises a VR headset component configured to be worn over the eyes of the user 102 and/or a VR controller component configured to be worn and/or controlled by a body part of the user 102, such as the user's hand, arm, foot, leg, torso, and the like. A VR computing device may include an augmented reality (AR) device, which combines a virtual environment with a real-world environment from the perspective of the user 102. A VR computing device may include a VR headset, such as glasses, goggles, full headsets, and/or the like, and a computing device that is connected to the VR headset and/or embedded therein. For example, a VR computing device may include a smartphone positioned within a viewing device, a display within a viewing device that is controlled by an external computing device, and/or the like.

Referring to FIGS. 1 and 2A-2C, the user 102 may interact with the computing device 104 to generate the payment device using the virtual environment. The computing device 104 may receive user data identifying the user from the user 102. The user 102 may input the user data into the computing device 104 and/or a user device (not shown) associated with the user may communicate a message comprising data fields containing the user data to the computing device 104. The computing device 104 may store at least a portion of the user data in the user and/or transaction database 108. In some non-limiting embodiments or aspects, the user and/or transaction database 108 may already contain data associated with the user 102, and the user data already contained in the user and/or transaction database 108 may be matched with the user data received from the user 102. The user data received from the user 102 may be stored in association with the data associated with the user 102 and already contained in the user and/or transaction database 108. As a non-limiting example, the data associated with the user 102 and already contained in the user and/or transaction database 108 may comprise historical transaction data associated with a historical payment transaction engaged in by the user 102. The historical transaction data may comprise data associated with a payment device (already existing) used by the user 102 to initiate the payment transaction, the merchant with whom the user 102 engaged in the payment transaction, the goods and/or services involved in the payment transaction, the amount of the payment transaction, or any other data used and/or generated during processing of the payment transaction.

Figure 2C:
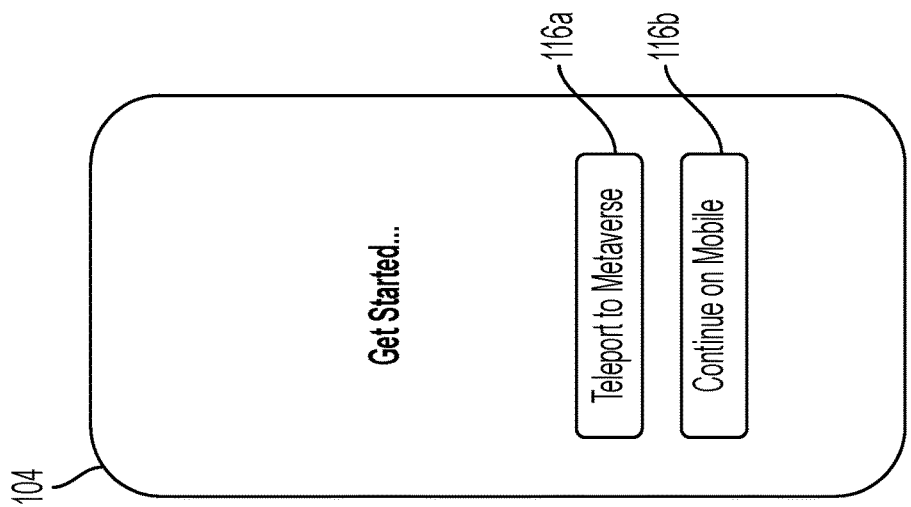
FIG. 2A-2C show graphical user interfaces associated with launching a virtual environment, according to some non-limiting embodiments or aspects.
Figure 2B:
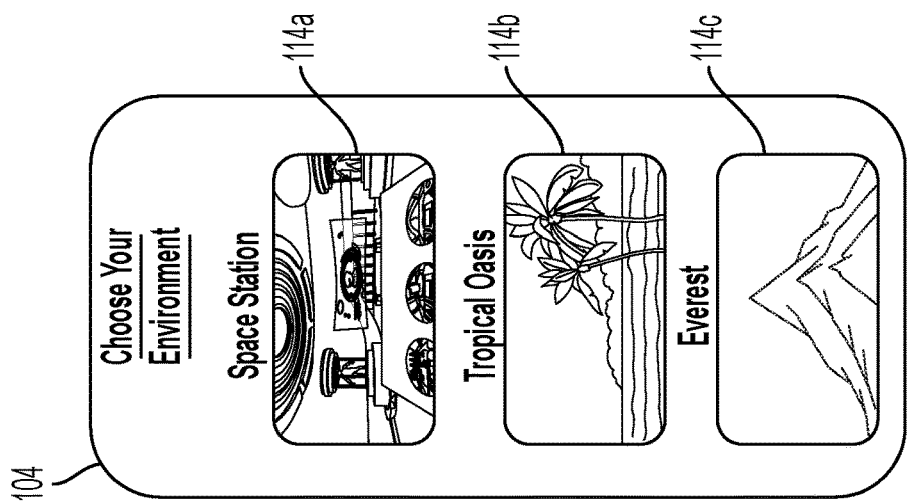
Figure 2A:
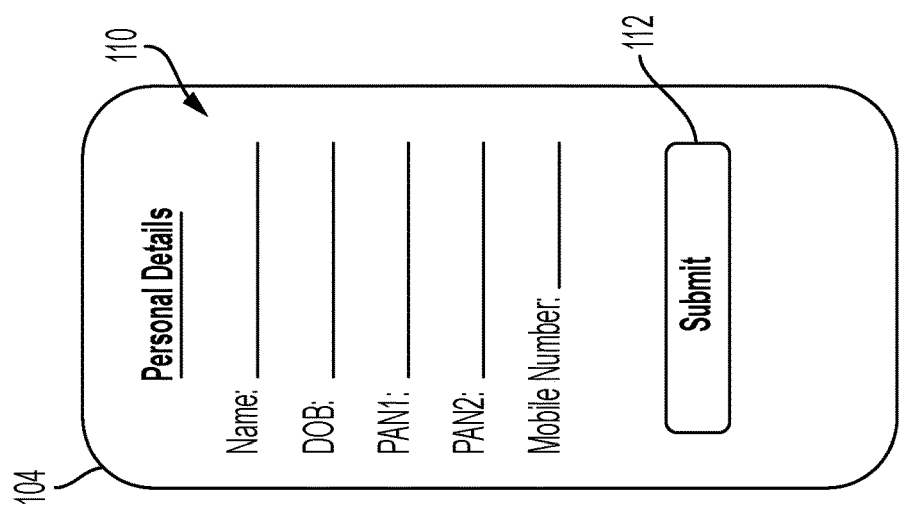

As shown in FIG. 2A, the computing device 104 may display a user data input screen 110 (e.g., graphical user interface (GUI)) for receiving the user data identifying the user 102. Non-limiting examples of user data include any data element that may contribute to identifying the user, such as the name of the user, the user's date of birth, the user's contact data (e.g., phone number, residential address, email address, and the like), social security number (or other government-issued identification number, and the like), employment data (employer name or identifier, employer contact data, duration of employment, salary data, and the like), existing payment device data (PAN, expiration date, card verification value (cvv) code, and the like of the user's existing issued payment devices), current bank data (financial institution name or identifier, bank account number, and the like). The user data input screen 110 may display a user data submission element 112 which may be selected by the user 102 to submit the user data, such as causing storage of the user data in the user and/or transaction database 108.

In response to receiving the user data, the computing device 104 may identify the user 102 from among a plurality of users. For example, a database query may be formed to identify the user in one or more database systems.

Referring to FIG. 2B, the computing device 104 may display a plurality of environment selection elements 114a-114c to cause the user 102 to select a design of a virtual environment. The computing device 104 may be capable of launching and executing a plurality of different virtual environments with which the user 102 may interact. By "different" virtual environments, is meant that the virtual environments contain at least one different design element. For example, the different virtual environments may have at least one different theme, different design of a same or similar theme, different story, different character (e.g., avatar), and the like. The environment selection elements 114a-114c may enable the user 102 to customize the virtual environment experience and select the virtual environment with which to engage.

In the non-limiting example shown in FIG. 2B, the virtual environment options contain a space station theme (first environment selection element 114a), a tropical oasis theme (second environment selection element 114b), and a Mount Everest theme (third environment selection element 114c), although it will be appreciated that the present disclosure contemplates any theme of virtual environment. The theme may include a particular time, place, setting, and/or the like. In some examples the theme may be branded and represent characters and/or other references to a movie, television program, video game, and/or the like.

Selection of an environment selection element 114a of the environment selection elements 114a-114c by the user 102 (received by the computing device 104) may cause the corresponding virtual environment of the selected environment to be launched by the computing device 104 as described hereinafter. The virtual environment may be integrated with at least one of a virtual gaming environment (e.g., a video and/or computer game), a virtual concert environment, and/or a virtual shopping environment, integrated with a social media platform, or integrated into any other software-generated environment or platform. For example, these platforms may comprise a plugin configured to launch the virtual environment as described herein, and the payment device may be created virtually within the environment associated with the platform. For example, the virtual environment may be launched in response to a user selecting an interactive element in at least one of a virtual gaming environment, virtual concert environment, and/or virtual shopping environment (or any other virtual environment) in which the user is immersed. Alternatively, the virtual environment may not be integrated with any other software-generated environment or platform.

In some non-limiting embodiments or aspects, the virtual environment may be launched in response to a user engaging with the at least one computing device at a physical merchant location, such as a VR kiosk and/or a VR headset located at the physical merchant location.

Referring to FIG. 2C, the computing device 104 may display a plurality of environment type selection elements 116a-116b to cause the user 102 to select the type of virtual environment to be launched. "Environment type" may refer to the medium in which the virtual environment is launched on the computing device 104. The virtual environment may be launched using any suitable medium. For example, the computing device 104 may display a first environment type selection element 116a which, when selected by the user, causes the virtual environment to be launched as a VR environment, such as a partially or fully immersive virtual environment for the user 102. For example, the computing device 104 may display a second environment type selection element 116b which, when selected by the user, causes the virtual environment to be displayed on a screen of a non-VR mobile device (e.g., a smartphone) of the user.

With continued reference to FIGS. 1-2C, the computing device 104 may launch the virtual environment configured to interact with the user. Launching the virtual environment may comprise displaying at least one interactive GUI on the computing device 104 configured to receive user selection inputs. Executing the virtual environment may comprise displaying a series of interactive GUIs on the computing device 104 configured to receive user selection inputs. The interactive GUIs may be displayed in a sequence with different rules configured to advance to a next interface. The sequence may be predetermined and/or determined based on branching logic dependent on user input or the like.

Figure 3:
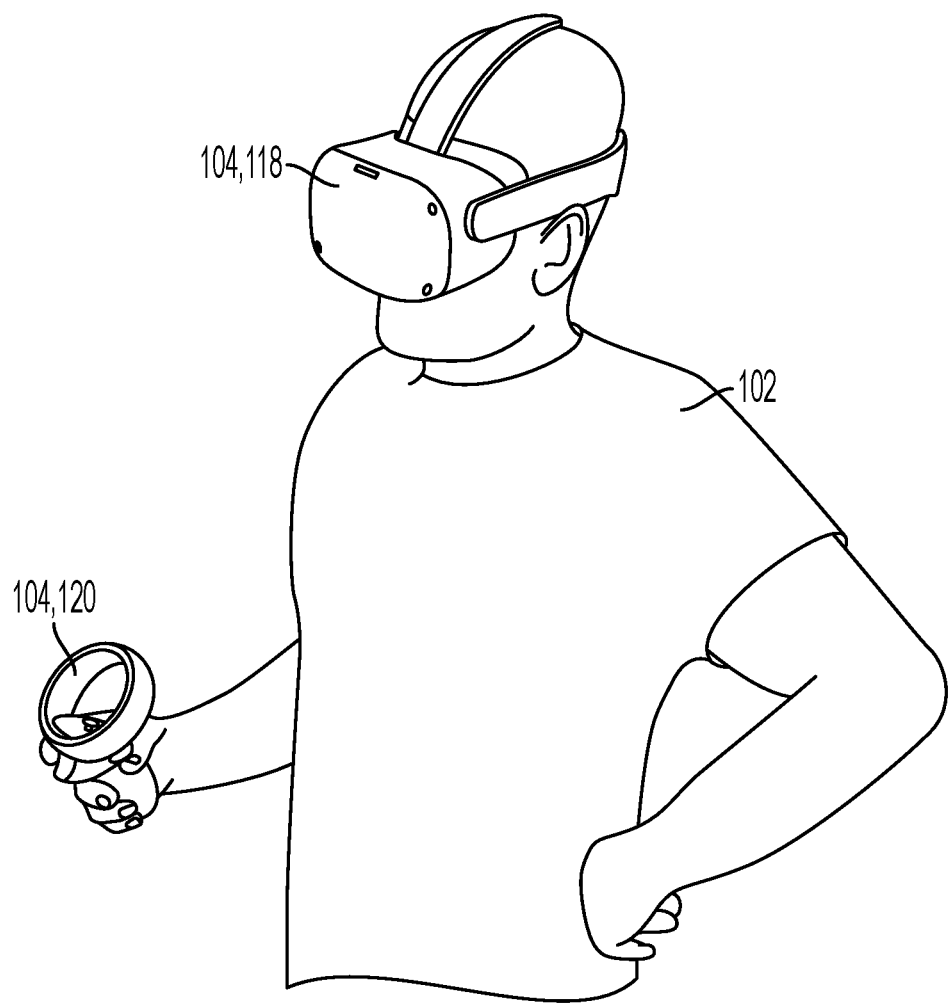
FIG. 3 is a schematic diagram of a user interacting with a computing device in the form of a virtual reality computing device, according to some non-limiting embodiments or aspects.

Referring to FIG. 3, the user 102 interacting with the computing device 104 in the form of a VR computing device is shown according to some non-limiting embodiments or aspects. The VR computing device may comprise a VR headset 118 configured to be worn over the eyes of the user 102. The VR headset 118 may be configured to display the virtual environment. The VR headset 118 may be configured to detect a direction faced by the user 102. The display of the virtual environment may change in response to the direction faced by the user 102 changing, so as to provide a partially and/or fully-immersive virtual environment for the user 102. When the VR headset 118 detects that the user 102 is facing a first direction, a first region of the virtual environment may be displayed on the interactive GUI, and when the VR headset 118 detects that the user 102 is facing a second (different) direction, a second (different) region of the virtual environment may be displayed on the interactive GUI.

In some non-limiting embodiments or aspects, the virtual environment experienced by the user 102 may be a fully-immersive virtual environment. In the fully-immersive virtual environment, a region of the virtual environment is displayed on the interactive GUI for any direction faced by the user. This includes the user 102 facing any horizontal direction about the user 102 (e.g., left, right, front, back), facing any vertical direction about the user 102 (e.g., up, down), and any combination thereof.

The VR computing device may comprise a VR controller 120. The VR controller 120 may enable the user 102 to further interact with the virtual environment and may enable the user 102 to cause a component displayed by the interactive GUI to be moved and/or to cause a component displayed by the interactive GUI to be selected. The VR controller 120 may function as a cursor in the virtual environment. The VR controller 120 may detect a motion of the user 102 and cause a component of the interactive GUI to be moved and/or selected, based on the detected motion. For example, a motion of the user 102 in a first direction may cause the component of the interactive GUI to be moved in that same first direction, and the distance the component is moved on the interactive GUI may be based on the extent of the motion of the user 102 detected by the VR controller 120, which may include a distance moved, the velocity and/or acceleration of the motion, and/or the like.

The VR controller 120 shown in FIG. 3 is shown as a hand controller held by the user 102 such that a hand motion of the user 102 may be detected by the VR controller 120. In this way, hand and/or arm motions of the user may cause a component of the interactive GUI to be moved and/or selected. However, it will be appreciated that the VR controller 120 may be engaged with an additional and/or alternative part of the user's body, such as the arm, foot, leg, torso, and the like and additionally and/or alternatively detect motion thereof. Moreover, it will be appreciated that in some non-limiting embodiments or aspects the VR controller 120 may be a camera or other sensor that visually tracks a user's movements and gestures such that the user does not need to hold or otherwise support a sensor.

With continued reference to FIG. 3, predetermined motions (e.g., gestures, selections of elements, and/or the like) detected by the VR headset 118 and/or the VR controller 120 may be associated with predetermined actions being executed on the interactive GUI. For example, predetermined motions detected by the VR headset 118 and/or the VR controller 120 may be associated with a different region of the virtual environment being displayed on the interactive GUI. For example, predetermined motions detected by the VR headset 118 and/or the VR controller 120 may be associated with a component of the interactive GUI being moved. For example, predetermined motions detected by the VR headset 118 and/or the VR controller 120 may be associated with a component of the interactive GUI being selected (e.g., receiving any of the user selection inputs described herein).

Figure 4:
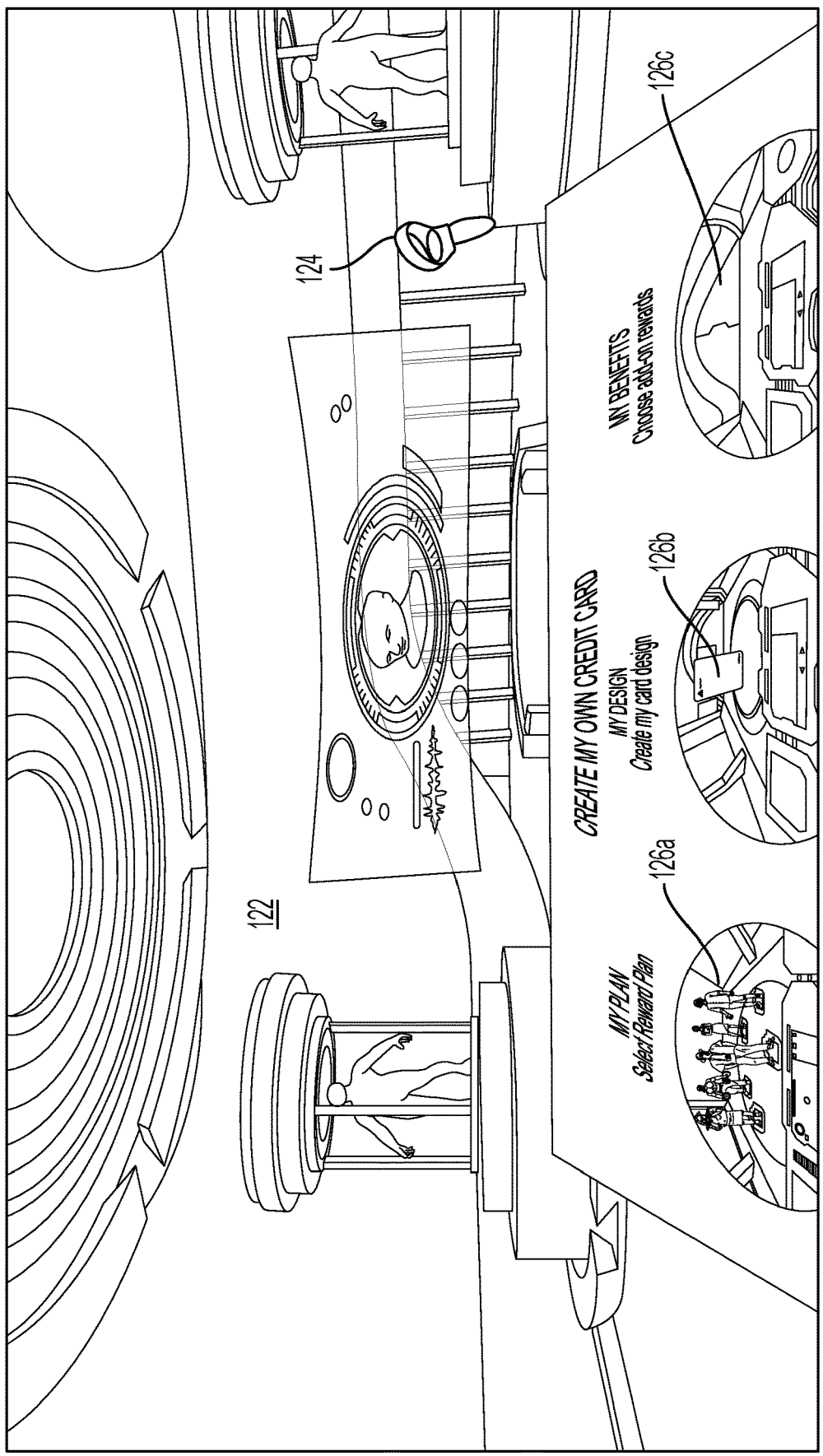
FIG. 4 is a schematic diagram of a virtual environment, according to some non-limiting embodiments or aspects.

Referring to FIG. 4, a virtual environment 122 is shown according to some non-limiting embodiments or aspects. The user 102 may interact with the virtual environment 122. The virtual environment 122 shown in these examples corresponds to the space station environment (selected by the user 102 using FIG. 2B), but it will be appreciated that a virtual environment may be displayed that corresponds to any theme. The virtual environment 122 may comprise design elements that correspond to the theme of the virtual environment 122. The virtual environment 122 may be immersive, such as when using a VR computing device, such that the user 102 may view different regions of the virtual environment 122 by facing different directions. In some non-limiting embodiments or aspects, the user 102 may remain in a fixed position and face a different direction to experience the virtual environment 122. In some non-limiting embodiments or aspects, the user 102 may physically move (in reality) to move through the virtual environment 122, with the region of the virtual environment 122 displayed depending on the physical position and/or the direction faced by the user 102.

With continued reference to FIG. 4, the interactive GUI of the virtual environment 122 may display a movable cursor 124. The cursor 124 may be moved throughout the virtual environment 122 by the user 102. The cursor 124 may move in the virtual environment 122 in response to a corresponding motion from user 102. For example, the VR controller 120 (from FIG. 3) may correspond to the cursor 124 such that movement of the VR controller 120 by the user 102 may move the cursor 124. The cursor 124 may interact with components of the GUI in order to select the components based on input from the user 102. The cursor 124 may interact with components of the GUI in order to move the components based on input from the user 102. In some non-limiting embodiments, the cursor 124 may be represented by a virtual hand or finger of the user in the virtual environment, such that the user moves their hand in a manner that is tracked by a VR controller to move the cursor.

The interactive GUI of the virtual environment 122 may display at least one task selection element 126a-126c, and selection of a task selection element 126a-126c by the user (e.g., such as with the cursor 124) may launch a user interface corresponding to the selected task to be displayed. As non-limiting examples, a first task selection element 126a may launch a user interface that enables the user 102 to select an avatar and/or at least one payment device reward corresponding thereto, a second task selection element 126b may launch a user interface that enables the user 102 to select at least one payment device design component, and a third task selection element 126c may launch a user interface that enables the user 102 to select at least one add-on reward.

Figure 5:
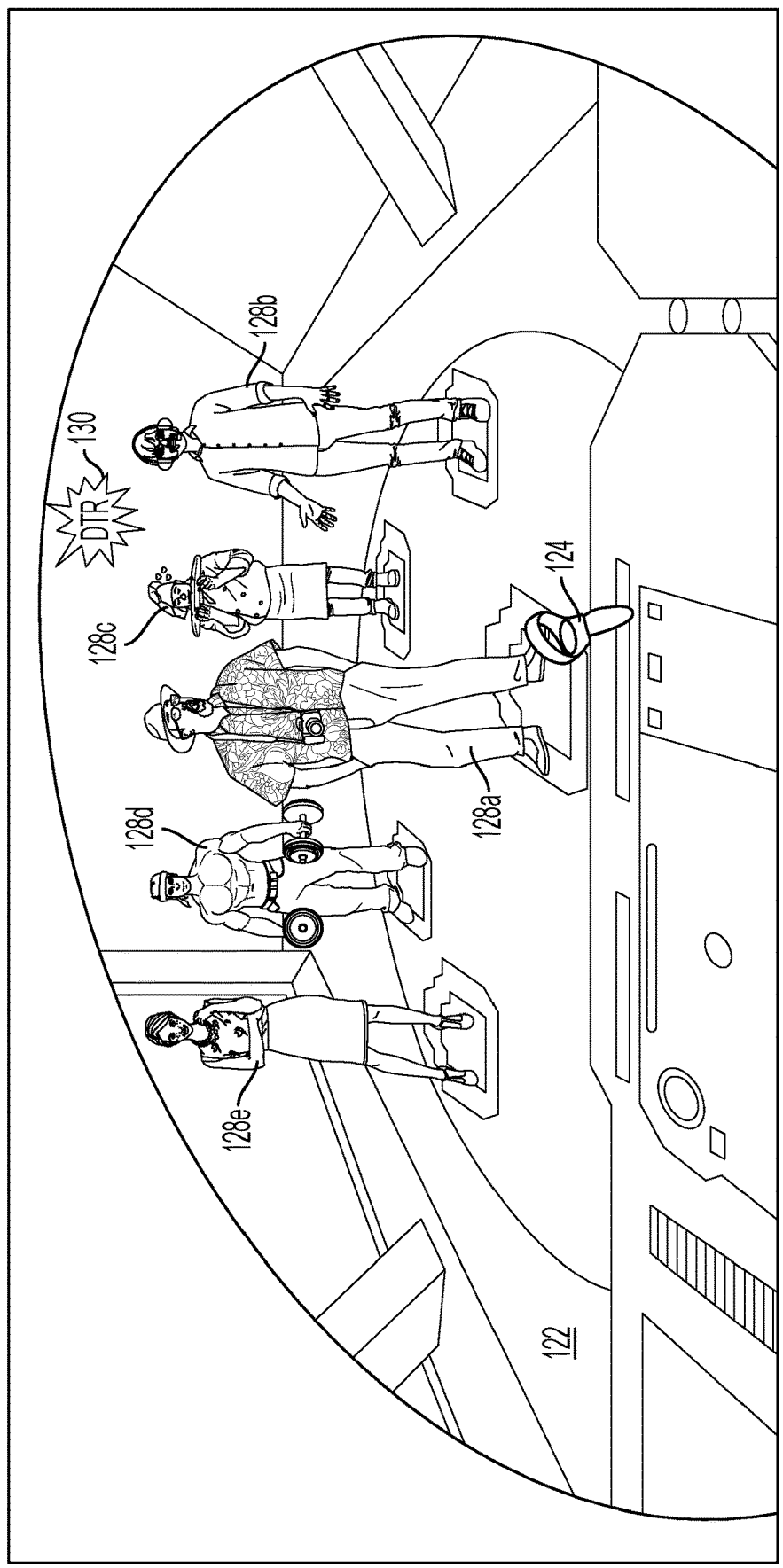
FIG. 5 is a schematic diagram of a virtual environment in which an avatar selection interactive user interface is displayed, according to some non-limiting embodiments or aspects.

Referring to FIG. 5, a virtual environment 122 is shown in which an avatar selection interactive user interface is displayed according to some non-limiting embodiments or aspects. In the avatar selection interactive user interface, a plurality of avatars 128a-128e may be displayed. The avatar 128a-128e may be a virtual persona (e.g., human, animal, fictional character, animate or inanimate object, symbol, and/or the like) corresponding to and/or representing at least one payment device reward that may be associated with the payment device being generated. The at least one payment device reward may correspond to at least one category of goods and/or services for which the user 102 receives an enhanced reward, should the at least one payment device reward be selected by the user 102. Non-limiting examples of payment device rewards may include rewards for purchases associated with travel, rewards for purchase associated with technology products, rewards for purchase associated with food and/or dining purchases, rewards for purchase associated with fitness purchases, rewards for purchase associated with fashion purchases, and/or any combination thereof. However, it will be appreciated that any other type of payment device rewards category may be implemented according to the present disclosure.

Each of the displayed avatars 128a-128e may correspond to at least one payment device reward. For example, the plurality of avatars 128a-128e may comprise a first avatar 128a associated with a first reward associated with a first class of goods/services and not a second class of goods/services and a second avatar 128b associated with a second reward associated with the second class of goods/services and not the first class of goods/services.

The correspondence between the avatars 128a-128e and the respective payment device reward may be represented by the design of the avatars 128a-128e relating to the type of payment device reward. For example, the design of the avatar may embody a characteristic that associates the avatar 128a-128e with the theme of the payment device reward. As one non-limiting example, avatar 128c of a chef character may be associated with the food and/or dining purchases payment device reward based on the association between chef characters and food-related themes.

With continued reference to FIG. 5, in response to the avatars 128a-128e being displayed in the interactive virtual environment 122, the user interface may receive a user selection input selecting an avatar 128c. This may involve the user 102 using the cursor 124 to select the avatar 128c. In response to receiving the user's avatar selection input, the selected avatar 128c may be associated with the user 102. In response to receiving the user's avatar selection input, the at least one payment device reward corresponding to the selected avatar may be associated with the user 102.

Referring to FIGS. 1 and 5, the computing device 104 may generate a recommendation for the user 102 based on the identity of the user and/or data associated with the user 102. The user and/or transaction database 108 may comprise data associated with the user 102. The data associated with the user may comprise historical transaction data associated with the user 102. The computing device 104 may analyze the historical transaction data associated with the user 102 from the user and/or transaction database 108 to generate at least one recommendation for the user 102. For example, the computing device 104 may generate a recommendation for the user 102 regarding the avatar and/or the at least one payment device reward that the user 102 should select. The recommendation may be generated based on the historical transaction data associated with the user 102. Additionally or alternatively, the recommendation may be generated based on user data collected and/or generated on the platform on which the virtual environment was launched. For example, where the virtual environment may be integrated with a platform comprising at least one of a virtual gaming environment, a virtual concert environment, and/or a virtual shopping environment, integrated with a social media platform, or integrated into any other software-generated environment or platform, the recommendation may be based on data associated with the user collected and/or generated by these platforms based on user activity on these platforms. Such data may include user gaming data, virtual shopping data for the user, social media data associated with the user, and the like.

The recommendation may be based on which of the at least one payment device rewards would be expected to save the user the most money based on the historical transaction data (e.g., spending patterns) associated with the user 102. For example, a user with significant travel-related purchases in their historical transaction data may be expected to save more money using a payment device reward associated with travel-related purchases, while a user with significant fitness-related purchases in their historical transaction data may be expected to save more money using a payment device reward associated with fitness-related purchases. A single recommendation may be generated, or a plurality of recommendations may be generated. A reason for the recommendation may be displayed, such as an analysis of the relative projected cost savings for each payment device reward over a time period.

Referring to FIG. 5, the generated recommendation may be displayed in the interactive GUI as a recommendation element 130. The recommendation element 130 may be arranged on the user interface in a position (e.g., proximate to) relative to the avatar and/or the payment device reward recommended for the user 102. The recommendation element 130 may be displayed in any suitable form, such as a marking or other form of emphasis on the avatar and/or the payment device reward recommended for the user 102. In the non-limiting example shown in FIG. 5, the recommendation element 130 is arranged proximate to the chef-themed avatar 128c, and the recommendation element 130 indicates that the chef-themed avatar 128c is the digital twin recommendation ("DTR") associated with the user 102 (e.g., the avatar 128c that most closely resembles the historical spending patterns of the user 102).

Figure 6:
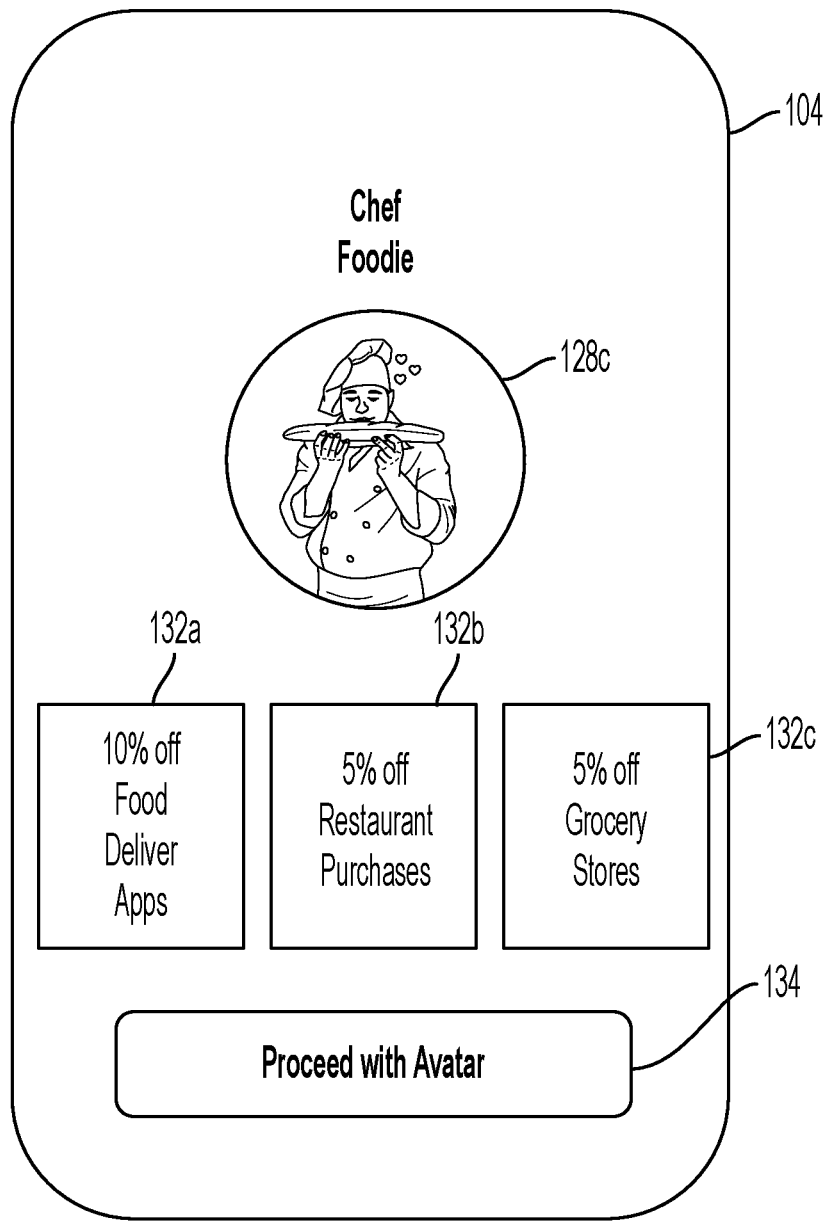
FIG. 6 is a schematic diagram of a virtual environment in which a payment device reward selection interactive user interface is displayed, according to some non-limiting embodiments or aspects.

Referring to FIG. 6, a virtual environment is shown in which a payment device reward selection interactive user interface is displayed according to some non-limiting embodiments or aspects. Unlike FIG. 5, the virtual environment shown in FIG. 6 is shown as displayed on a non-VR computing device 104 (e.g., on a user interface of a smart-phone); however, it will be appreciated that the virtual environment shown and described in FIG. 6 may also be displayed on a VR computing device 104.

The payment device reward selection interactive user interface may display the avatar 128c selected by the user 102 (such as using the virtual environment 122 displayed in FIG. 5). The selected avatar 128c may correspond to a plurality of payment device rewards, and the user may select at least one payment device reward of the plurality of payment device rewards corresponding to the avatar 128c. In some non-limiting embodiments, the user 102 may select only one payment device reward of the plurality of payment device rewards corresponding to the avatar 128c, or the user 102 may select more than one payment device reward of the plurality of payment device rewards corresponding to the avatar 128c. The plurality of payment device rewards corresponding to the avatar 128c may be displayed using reward selection elements 132a-132c, which are selectable elements. The user 102 may select the desired reward selection element(s) 132a-132c, such as using the cursor 124 (from FIG. 5) and/or by selecting the desired reward selection element(s) 132a-132c on the screen of the computing device 104 (e.g., by touching the desired reward selection element(s) 132a-132c).

In the non-limiting example shown in FIG. 6, the plurality of payment device rewards corresponding to the chef-themed avatar 128c each comprise rewards associated with food-related purchases. For example, a first reward selection element 132a may provide 10% off purchases made on food delivery applications; a second reward selection element 132b may provide 5% off of restaurant purchases; and a third reward selection element 132c may provide 5% off of grocery store purchases. It will be appreciated that any other payment device reward program may be designed for food-related purchases, and any type of payment device reward program may be designed for other categories of purchases. The user interface of the computing device 104 may display an avatar confirmation element 134, which may be a selectable element selectable by the user 102 to confirm selection of the selected avatar 128c and/or the selected payment device rewards. In response to selection of the avatar confirmation element 134. The selected avatar 128c and/or the selected payment device reward(s) may be associated with the user 102.

As described in connection with FIG. 5, a recommendation element 130 (not shown) may similarly be displayed on the user interface of FIG. 6. The computing device 104 may analyze the historical transaction data (e.g., from the user and/or transaction database 108 of FIG. 1) associated with the user 102 to determine at least one recommended payment device reward for the user 102 and may display the recommendation element 130 relative to the recommended payment device reward.

In some non-limiting embodiments or aspects, each avatar and/or payment device reward may have an associated price corresponding to the amount due by the user 102 for associating the avatar and/or payment device reward with the payment device, and the price may be displayed on the interactive user interface.

Figure 7:
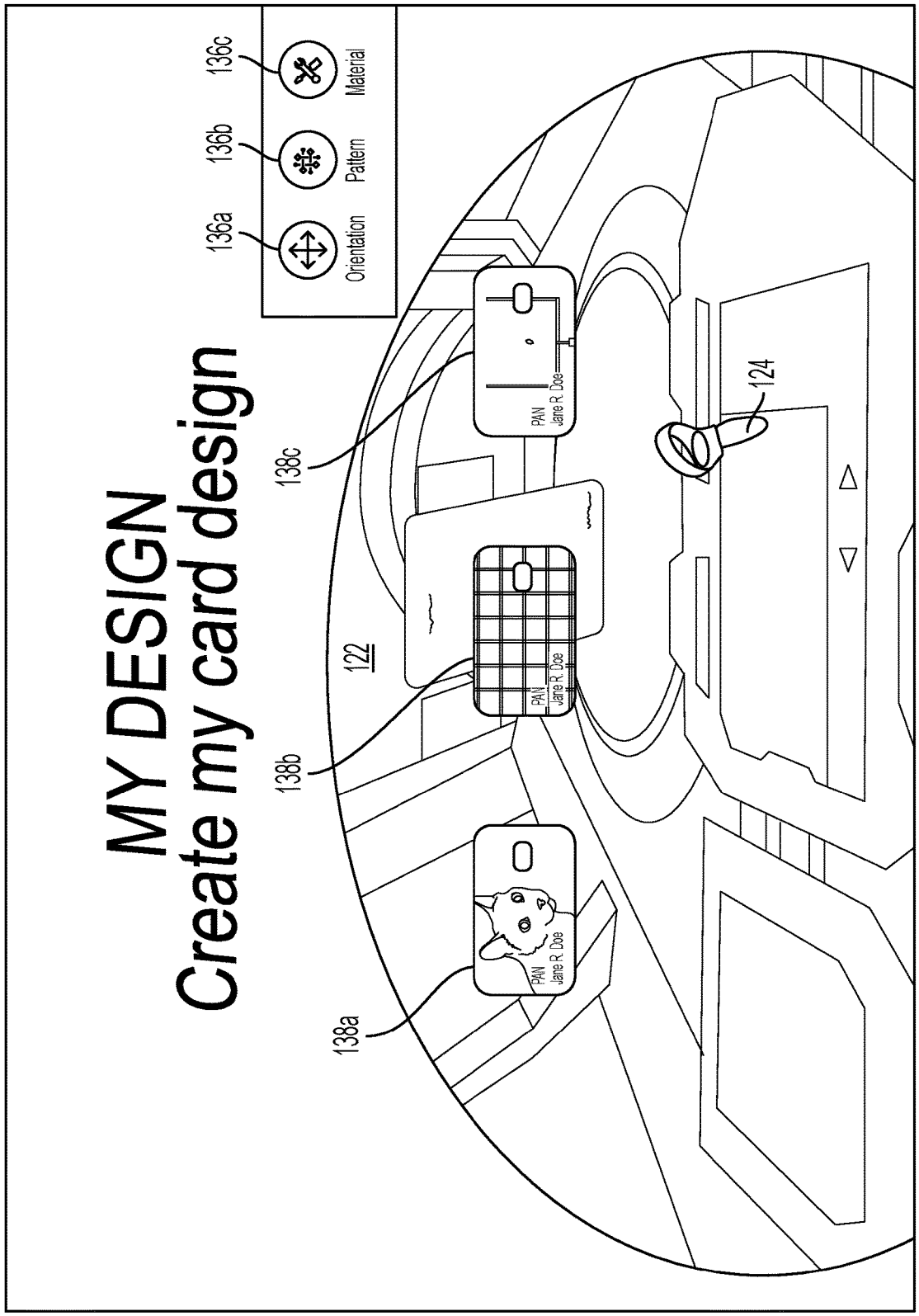
FIG. 7 is a schematic diagram of a virtual environment in which a payment device design component selection interactive user interface is displayed, according to some non-limiting embodiments or aspects.

Referring to FIG. 7, a virtual environment 122 is shown in which a payment device design component selection interactive user interface is displayed according to some non-limiting embodiments or aspects. The payment device design components may relate to a visual and/or tactile design feature of the payment device being generated using the virtual environment 122. For example, the payment device design components may comprise at least one of a payment device graphic design, a payment device orientation, a payment device material, and/or any combination thereof. A plurality of design component categories 136a-136c may displayed on the interactive user interface as selectable elements. The user 102 may select one of the design component categories 136a-136c to enable the user to further customize aspects of the selected design component category 136b. Non-limiting examples of the design component categories comprise a first design component category 136a enabling customization of the orientation (e.g., portrait or landscape) of the payment device (e.g., and the graphics thereof), a second design component category 136b enabling customization of the graphic design of the payment device (e.g., a color, pattern, image, or other graphical design thereon), and a third design component category 136c enabling customization of the material forming the payment device (e.g., a specific type of plastic, metal, or other material, an environmentally friendly material, and the like).

With continued reference to FIG. 7, the second design component category 136b enabling customization of the graphic design of the payment device may be selected. The interactive user interface may display a plurality of graphic design options 138a-138c, each graphic design option 138a-138c comprising a selectable element. Each graphic design option 138a-138c may comprise a visual design of the payment device, and a plurality of different graphic design options 138a-138c may be displayed. Different graphic design options 138a-138c may comprise at least one different graphic design element, such as a different color, design component, arrangement of design components, and the like. In the non-limiting example of FIG. 7, three different graphic design options 138a-138c are shown, including a first graphic design option 138a comprising a cat-related design element, a second graphic design option 138b comprising a plaid-patterned design element; and a third graphic design option 138c comprising an American football-related design element. It will be appreciated that any other graphic design of a payment device may be displayed as an option.

In response to the computing device 104 displaying the plurality of graphic design options 138a-138c, the user 102 may select at least one of the graphic design options 138a-138c by a user selection input (e.g., selecting at least one selectable element of the graphic design options 138a-138c) such that the computing device 104 receives the user selection input. The computing device 104 may associate the selected payment device design component with the user 102, such that the generated payment device reflects the user's 102 selection.

It will be appreciated that a similar process may be executed to customize the first design component category 136a and/or the third design component category 136c.

In some non-limiting embodiments or aspects, each custom design component may have an associated price corresponding to the amount due by the user 102 for associating the design component with the payment device, and the price may be displayed on interactive user interface.

Figure 8:
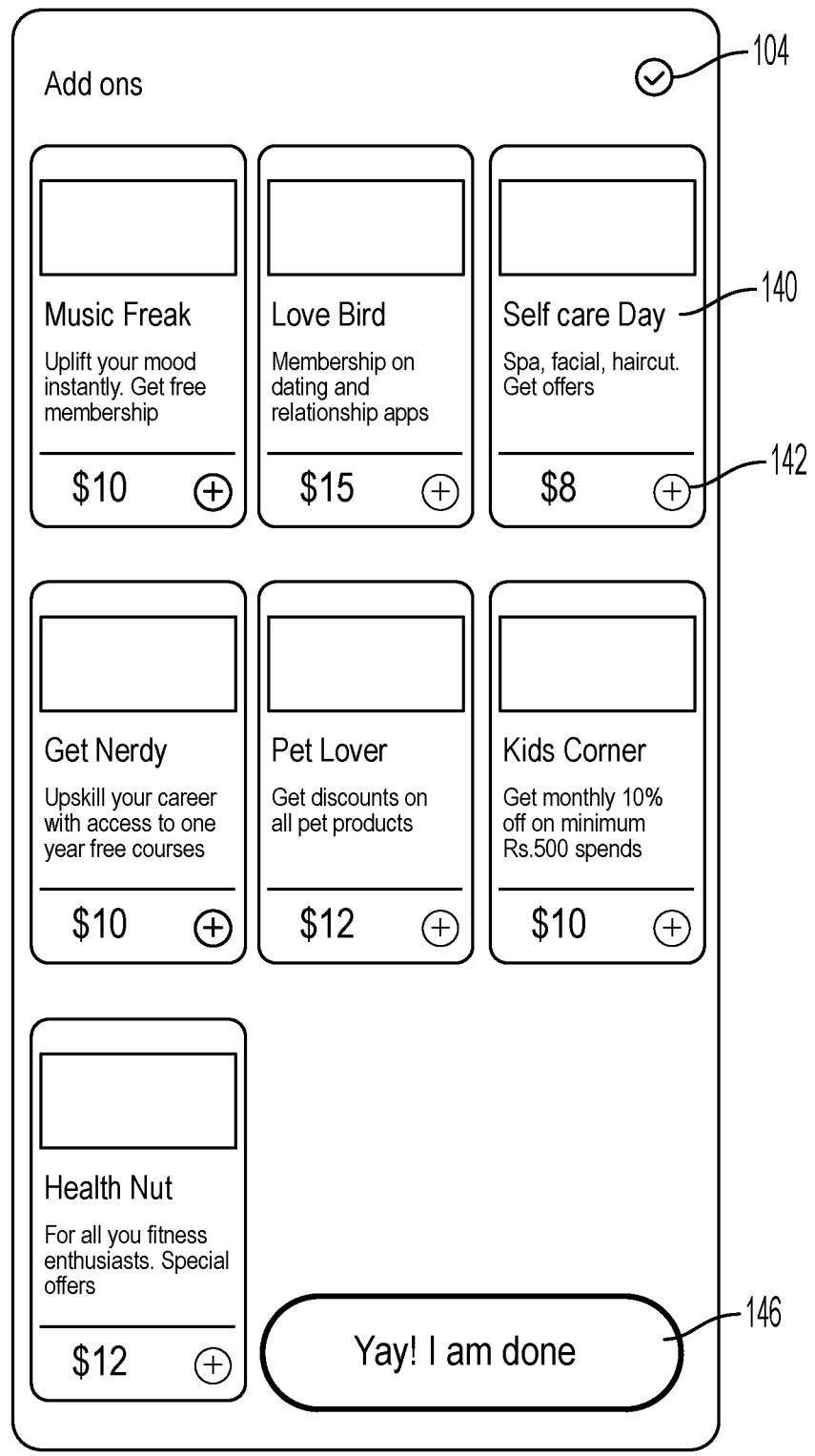
FIG. 8 is a schematic diagram of a virtual environment in which an add-on reward selection interactive user interface is displayed, according to some non-limiting embodiments or aspects.

Referring to FIG. 8, a virtual environment is shown in which an add-on reward selection interactive user interface is displayed according to some non-limiting embodiments or aspects; unlike FIG. 7, the virtual environment shown in FIG. 8 is shown as displayed on a non-VR computing device 104 (e.g., on a user interface of a smartphone); however, it will be appreciated that the virtual environment shown and described in FIG. 8 may also be displayed on a VR computing device 104.

The interactive user interface of the add-on reward selection interactive user interface may display a plurality of add-on selection elements 140, which may be selectable elements associated with add-on rewards. An add-on reward may be any reward and/or discount received when using the payment device when the add-on reward is selected and associated with the payment device. The add-on reward may be different from the at least one payment device reward associated with the user (see FIGS. 5-6). For example, the add-on reward may comprise a discount associated with at least one good/service, at least one merchant, at least one merchant category code, and the like. Non-limiting examples of add-on rewards shown in FIG. 8 include membership to a service, membership to a mobile application, membership to a course, offers associated with a merchant category, a discount on merchant category, and the like.

Each add-on reward may have an associated price corresponding to the amount due by the user 102 for associating the add-on reward with the payment device, which may be displayed on the add-on selection element 140.

Each add-on selection element 140 may comprise a corresponding add selection element 142. Selection by the user of the add selection element 142 may comprise a user selection input, which the computing device 104 may receive in response to selection of the add selection element 142. In response to the user selecting the add selection element 142, the computing device 104 may associate the add-on reward associated therewith with the user 102, such that the generated payment device reflects the user's 102 selection.

The user interface of the computing device 104 may further comprise a redirection selectable element 146. The redirection selectable element 146 may be selected by the user 102 when all user selection input associated with the virtual environment has been completed and/or no further user selection inputs are required. For example, the redirection selectable element 146 may be selected by the user 102 after the user 102 has submitted a user selection input for at least one and/or all of: selection of at least one avatar, selection of at least one payment device reward, selection of at least one payment device design component, selection of at least one add-on reward, and/or any combination thereof.

Referring again to FIG. 1, in response to the user 102 selecting the redirection selectable element 146 (from FIG. 8), the computing device 104 may automatically generate a payment device issuance request. The payment device issuance request may comprise data fields containing data associated with the user selection inputs from the virtual environment, such as data fields containing at least one and/or all of: the selection input of at least one avatar, the selection input of at least one payment device reward, the selection input of at least one payment device design component, the selection input of at least one add-on reward, and/or any combination thereof. The payment device issuance request may comprise at least one data field comprising the user data identifying the user 102 received by the computing device 104 and/or stored in the user and/or transaction database 108.

The user 102 (e.g., the computing device 104 used by the user) may be redirected from the virtual environment (which may be terminated) to the issuer system 106 (e.g., a device associated therewith), and the generated payment device issuance request may be communicated to and received by the issuer system 106.

In response to receiving the payment device issuance request, the issuer system 106 may generate and/or issue the payment device to the user 102 based on any of the user selection inputs received from the user in the virtual environment. The issuer system 106 may generate and/or issue a physical payment device (e.g., a physical credit or debit card) to the user 102. Generating and/or issuing the payment device may comprise manufacturing the physical payment device (e.g., printing a credit card or debit card). Generating and/or issuing the payment device may comprise providing the physical payment device to the user 102. Generating and/or issuing the payment device may comprise generating a payment account associated with the user 102 and linking the payment device and the user 102 to the generated payment account.

The generated and/or issued payment device may comprise at least one design component associated with the user (e.g., via user selection thereof), such that it has the physical and/or visual and/or tactile appearance as specified by the user in the virtual environment. In non-limiting embodiments, the payment device may be manufactured in a customized print-on-demand manner that formats one or more payment device templates with data that is specific to the user, including at least one design component.

The generated and/or issued payment device may comprise data associated with the at least one payment device reward associated with the user 102 (e.g., via user selection thereof), such that the selected reward is applied during initiation of subsequent payment transactions with the generated and/or issued payment device. Data directly associated with the selected payment device reward may be stored on the payment device itself. Alternatively, data directly associated with the selected payment device reward may be stored in a database separate from the payment device itself, and data stored on the payment device itself (e.g., a PAN number) may be associated and stored in the separate database with the data directly associated with the selected payment device reward, such that the payment device is said to comprise data associated with the at least one payment device reward associated with the user 102. For example, the payment device itself may store a PAN number of the payment device and not store data directly associated with the selected payment device reward. However, during processing of a transaction initiated with the payment device, the payment device reward associated with the user 102 may be applied based on association between the PAN and the data directly associated with the selected payment device reward stored in the separate database. The database storing the association between the PAN and the data directly associated with the selected payment device reward may be invoked during processing of the payment transaction to identify the association therebetween and/or apply the selected payment device reward to the payment transaction. In some non-limiting embodiments or aspects, a range of PAN numbers may correspond to a payment device reward such that the payment device reward can be determined based on the PAN number itself.

While the launched virtual environment shown and described in FIGS. 1-8 has heretofore been discussed in the context of a single user engaging with the virtual environment to generate a payment device, in some non-limiting embodiments or aspects, a plurality of users may simultaneously engage with the virtual environment in a multi-user mode to generate one or more payment devices for the multiple users engaging with the virtual environment. For example, a single, joint payment device to be issued to and shared by the multiple users may be generated in the virtual environment. For example, each of the multiple users engaging in the virtual environment simultaneously may generate a separate payment device. The users may use one or more computing devices (e.g., one or more VR headsets) to simultaneously engage in the same virtual environment. The users simultaneously engaging in the virtual environment may be viewable to one another in the virtual environment such that a first user in the virtual environment may see a character (e.g., an avatar) representing the second user in the environment.

Figure 9:
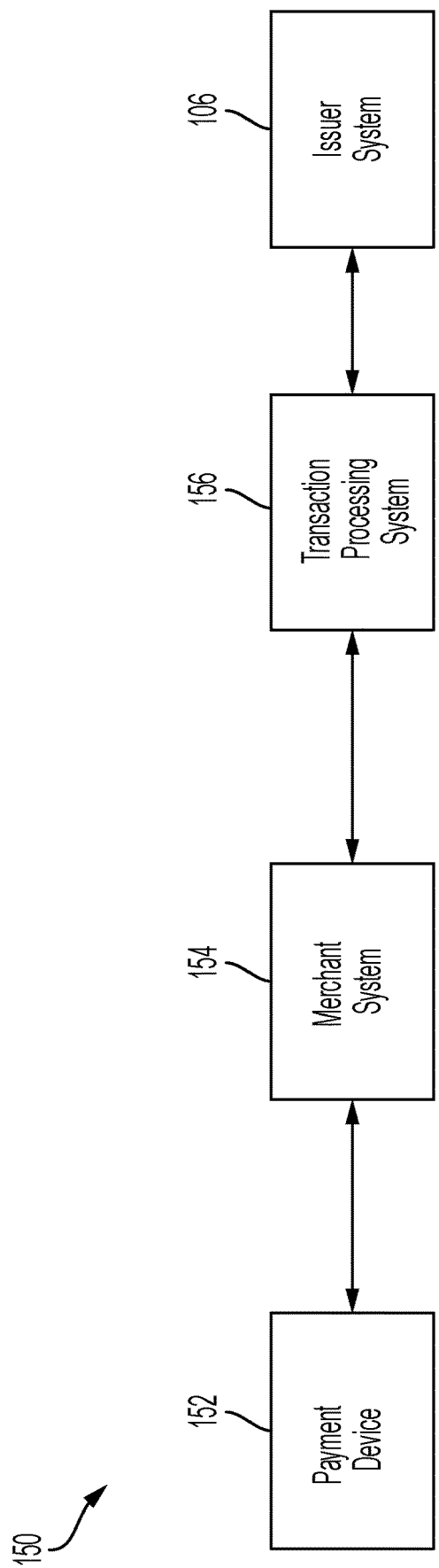
FIG. 9 is a schematic diagram of an electronic payment processing network for processing electronic payment transactions of a payment device, according to some non-limiting embodiments or aspects.

Referring to FIG. 9, an electronic payment processing network 150 is shown for processing electronic payment transactions of a payment device according to some non-limiting embodiments or aspects. Payment device 152 may comprise the payment device generated and issued by the issuer system 106 to the user 102 (not shown) based on the user selection inputs from the virtual environment 122 (not shown). The payment device 152 may be configured to initiate payment transactions, such as electronic payment transactions, between the user 102 and a merchant over the electronic payment processing network 150. The electronic payment processing network 150 may comprise a merchant system 154 associated with the merchant engaging with the user 102 in the payment transaction. The electronic payment processing network 150 may comprise a transaction processing system 156 associated with the transaction service provider associated with the payment device 152 issued to the user 102. The electronic payment processing network 150 may comprise the issuer system 106 associated with the issuer that generated and issued the payment device 152 issued to the user 102.

With continued reference to FIG. 9, the payment device 152 may initiate a payment transaction with the merchant system 154. This may comprise initiating a payment transaction at a location of the merchant by engaging the payment device 152 with the merchant system 154, such as engaging the payment device 152 with a merchant point-of-sale device (not shown). This may comprise initiating a payment transaction remote from a location of the merchant by engaging the payment device 152 with the merchant system 154, such as by initiating an e-commerce transaction.

In response to the payment device 152 initiating the payment transaction, the merchant system 154 may generate a transaction request containing transaction data associated with the payment transaction. The transaction data may comprise data needed by the electronic payment processing network 150 to process the payment transaction, such as the data elements specified in ISO 8583. Processing the payment transaction may comprise authorizing, clearing, and settling the payment transaction. The merchant system 154 may communicate the transaction request to the transaction processing system 156.

In response to receiving the transaction request, the transaction processing system 156 may generate an authorization request containing at least a portion of the transaction data associated with the payment transaction. The transaction processing system 156 may communicate the authorization request to the issuer system 106 to cause the issuer system 106 to generate an authorization decision for the payment transaction. The authorization decision may be to authorize the transaction, decline the transaction, and/or any combination thereof.

In response to receiving the authorization request, the issuer system 106 may generate the authorization decision and generate an authorization response containing the authorization decision. The authorization decision may be based on the issuer system 106 analyzing at least a portion of the transaction data associated with the payment transaction and contained in the authorization request. The issuer system 106 may communicate the authorization request to the transaction processing system 156.

In response to receiving the authorization response, the transaction processing system 156 may generate a transaction response containing the authorization decision. The transaction processing system 156 may communicate the transaction response to the merchant system 154.

If the authorization decision of the issuer system 106 is to authorize the payment transaction (and/or at least partially authorize the payment transaction), the electronic payment processing network 150 may continue processing the payment transaction to completion, which may comprise clearing and/or settling the payment transaction.

Figure 10:
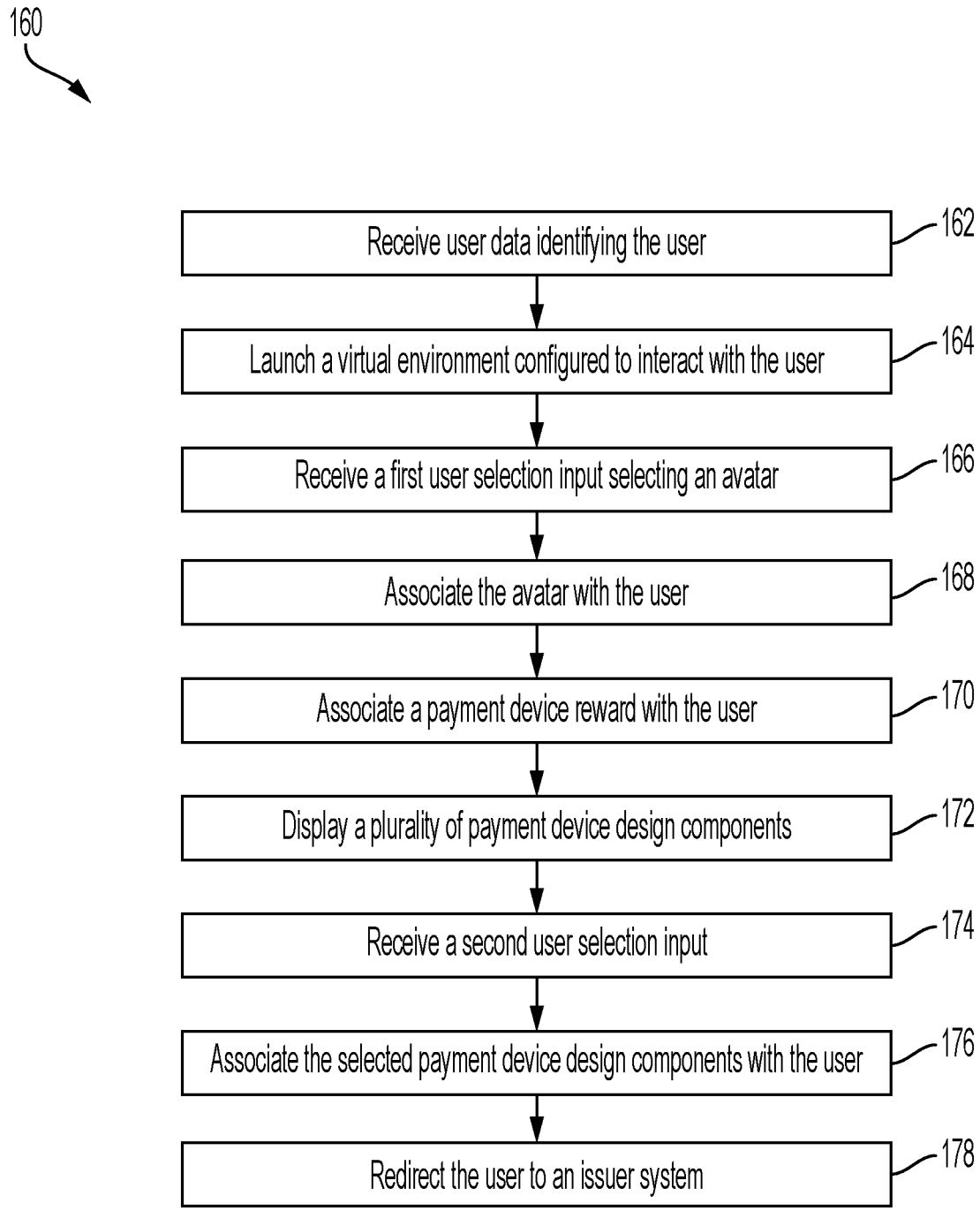
FIG. 10 is a step diagram of a method for generating a payment device using a virtual environment, according to some non-limiting embodiments or aspects.

Referring to FIG. 10, a method 160 is shown for generating a payment device using a virtual environment according to some non-limiting embodiments or aspects. At a step 162, the method 160 may comprise receiving, with at least one computing device of a user, user data identifying the user. At a step 164, the method 160 may comprise launching, with the at least one computing device, a virtual environment configured to interact with the user, wherein launching the virtual environment comprises displaying an interactive GUI configured to receive user selection inputs.

The method 160 may further comprises the following steps executed in the virtual environment. At a step 166, the method 160 may comprise receiving, with the interactive GUI of the at least one computing device, a first user selection input selecting an avatar, the avatar corresponding to at least one payment device reward. At a step 168, the method 160 may comprise associating, with the at least one computing device, the avatar with the user. At a step 170, the method 160 may comprise associating, with the at least one computing device, the at least one payment device reward with the user. At a step 172, the method 160 may comprise displaying, with the at least one computing device and on the interactive GUI, a plurality of payment device design components. At a step 174, the method 160 may comprise receiving, with the interactive GUI of the at least one computing device, a second user selection input selecting at least one of the plurality of payment device design components. At a step 176, the method 160 may comprise associating, with the at least one computing device, the at least one of the plurality of payment device design components with the user.

At a step 178, the method 160 may comprise redirecting, with the at least one computing device, the user to an issuer system by communicating a payment device issuance request to generate and issue a payment device to the user, wherein the payment device issuance request contains at least one of the following: the user data, the first user selection input, the second user selection input, and/or any combination thereof.

In some non-limiting embodiment or aspects, a computer program product for generating a payment device using a virtual environment includes at least one non-transitory computer readable medium including program instructions that, when executed by at least one processor, cause the at least one processor to execute one of the previously-described methods. The at least one processor may include any of the components shown in FIGS. 1-9 (e.g., the computing device 104, the issuer system 106, the user and/or transaction database 108, the VR headset 118, the VR controller 120, the payment device 152, the merchant system 154, the transaction processing system 156, and the like).

Figure 11:
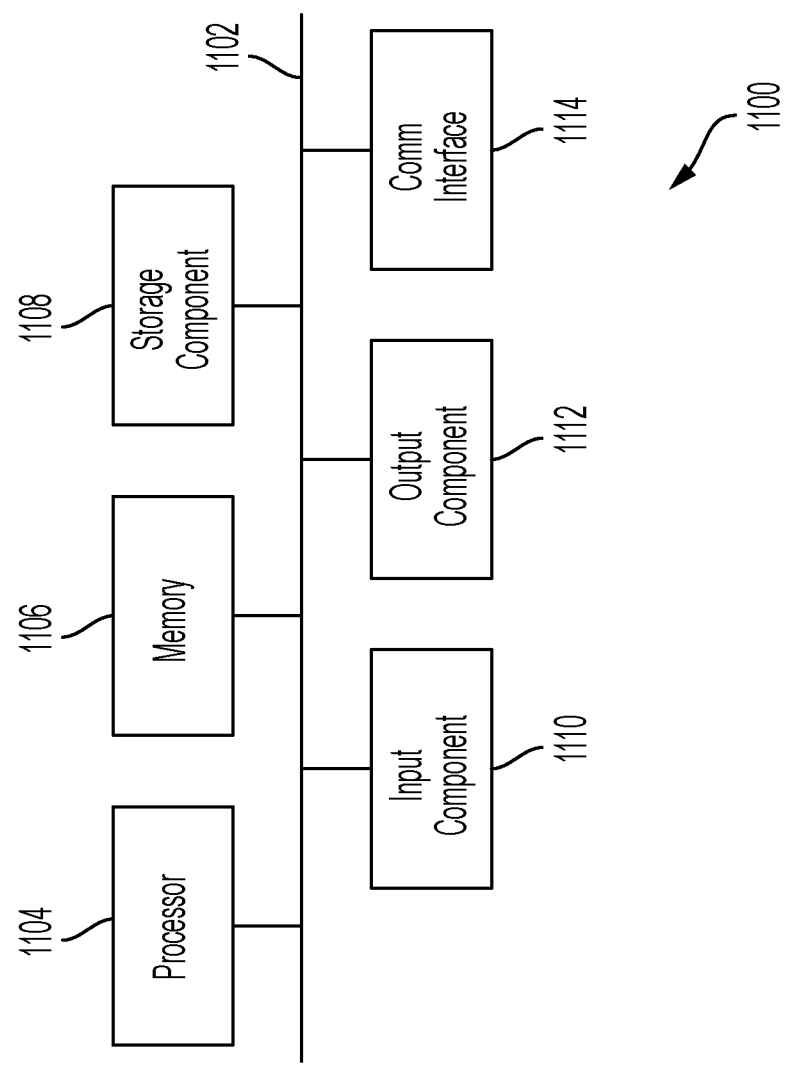
FIG. 11 illustrates example components of a device used in connection with non-limiting embodiments or aspects.

Referring to FIG. 11, shown is a diagram of example components of a device 1100 according to non-limiting embodiments or aspects. Device 1100 may correspond to any of the computing device 104, issuer system 106, user and/or transaction database 108, VR headset 118, VR controller 120, payment device 152, merchant system 154, and transaction processing system 156 shown in FIGS. 1-9, as an example. In some non-limiting embodiments or aspects, such systems or devices may include at least one device 1100 and/or at least one component of device 1100. The number and arrangement of components shown are provided as an example. In some non-limiting embodiments or aspects, device 1100 may include additional components, fewer components, different components, or differently arranged components than those shown in FIG. 11. Additionally, or alternatively, a set of components (e.g., one or more components) of device 1100 may perform one or more functions described as being performed by another set of components of device 1100.

As shown in FIG. 11, device 1100 may include a bus 1102, a processor 1104, memory 1106, a storage component 1108, an input component 1110, an output component 1112, and a communication interface 1114. Bus 1102 may include a component that permits communication among the components of device 1100. In some non-limiting embodiments or aspects, processor 1104 may be implemented in hardware, firmware, or a combination of hardware and software. For example, processor 1104 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 1106 may include random access memory (RAM), read only memory (ROM), and/or another type of dynamic or static storage device (e.g., flash memory, magnetic memory, optical memory, etc.) that stores information and/or instructions for use by processor 1104.

With continued reference to FIG. 11, storage component 1108 may store information and/or software related to the operation and use of device 1100. For example, storage component 1108 may include a hard disk (e.g., a magnetic disk, an optical disk, a magneto-optic disk, a solid state disk, etc.) and/or another type of computer-readable medium. Input component 1110 may include a component that permits device 1100 to receive information, such as via user input (e.g., a touch screen display, a keyboard, a keypad, a mouse, a button, a switch, a microphone, etc.). Additionally, or alternatively, input component 1110 may include a sensor for sensing information (e.g., a global positioning system (GPS) component, an accelerometer, a gyroscope, an actuator, etc.). Output component 1112 may include a component that provides output information from device 1100 (e.g., a display, a speaker, one or more light-emitting diodes (LEDs), etc.). Communication interface 1114 may include a transceiver-like component (e.g., a transceiver, a separate receiver and transmitter, etc.) that enables device 1100 to communicate with other devices, such as via a wired connection, a wireless connection, or a combination of wired and wireless connections. Communication interface 1114 may permit device 1100 to receive information from another device and/or provide information to another device. For example, communication interface 1114 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 1100 may perform one or more processes described herein. Device 1100 may perform these processes based on processor 1104 executing software instructions stored by a computer-readable medium, such as memory 1106 and/or storage component 1108. A computer-readable medium may include any non-transitory memory device. A memory device includes memory space located inside of a single physical storage device or memory space spread across multiple physical storage devices. Software instructions may be read into memory 1106 and/or storage component 1108 from another computer-readable medium or from another device via communication interface 1114. When executed, software instructions stored in memory 1106 and/or storage component 1108 may cause processor 1104 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
    receiving, with at least one computing device of a user, user data identifying the user;
    launching, with the at least one computing device, a virtual environment configured to interact with the user, wherein launching the virtual environment comprises displaying an interactive graphical user interface configured to receive user selection inputs;
    in the virtual environment:
        receiving, with the interactive graphical user interface of the at least one computing device, a first user selection input selecting an avatar, the avatar corresponding to at least one payment device reward;
        associating, with the at least one computing device, the avatar with the user;
        associating, with the at least one computing device, the at least one payment device reward with the user;
        displaying, with the at least one computing device and on the interactive graphical user interface, a plurality of payment device design components;
        receiving, with the interactive graphical user interface of the at least one computing device, a second user selection input selecting at least one of the plurality of payment device design components; and
        associating, with the at least one computing device, the at least one of the plurality of payment device design components with the user; and
    redirecting, with the at least one computing device, the user to an issuer system by communicating a payment device issuance request to generate and issue a payment device to the user, wherein the payment device issuance request contains at least one of the following: the user data, the first user selection input, the second user selection input, and/or any combination thereof.

2. The computer-implemented method of claim 1, wherein the at least one computing device comprises at least one of a smartphone, a desktop, a laptop, a virtual reality headset, a kiosk, and/or any combination thereof.

3. The computer-implemented method of claim 1, wherein the at least one computing device comprises a virtual reality headset wearable by the user,
    wherein the virtual reality headset is configured to detect a direction faced by the user such that a first region of the virtual environment is displayed on the interactive graphical user interface when the user faces a first direction and a second region of the virtual environment is displayed on the interactive graphical user interface when the user faces a second direction.

4. The computer-implemented method of claim 3, wherein the virtual environment comprises a fully-immersive virtual environment, such that a region of the virtual environment is displayed on the interactive graphical user interface for any direction faced by the user.

5. The computer-implemented method of claim 1, wherein a motion of the user detected by the at least one computing device causes a component displayed by the interactive graphical user interface to move on the graphical user interface.

6. The computer-implemented method of claim 5, wherein the motion of the user detected by the at least one computing device comprises a hand motion of the user.

7. The computer-implemented method of claim 1, wherein the first user selection input and/or the second user selection input comprises a predetermined motion of the user and/or user selection of a selectable element displayed on the interactive graphical user interface.

8. The computer-implemented method of claim 1, wherein generating the payment device comprises manufacturing, by the issuer system, a physical payment device, wherein the physical payment device comprises the at least one of the plurality of payment device design components associated with the user and comprises data associated with the at least one payment device reward associated with the user.

9. The computer-implemented method of claim 1, wherein the plurality of payment device design components comprise at least one of a payment device graphic design, a payment device orientation, a payment device material, and/or any combination thereof.

10. The computer-implemented method of claim 1, wherein a plurality of avatars are displayed, wherein each avatar corresponds to a different payment device reward, wherein the plurality of avatars comprise a first avatar associated with a first reward associated with a first class of goods/services and not a second class of goods/services and a second avatar associated with a second reward associated with the second class of goods/services and not the first class of goods/services.

11. The computer-implemented method of claim 1, further comprising:
    based on the selected avatar, displaying, with the at least one computing device and on the interactive graphical user interface, a plurality of payment device rewards corresponding to the selected avatar; and
    receiving, with the interactive graphical user interface of the at least one computing device, a third user selection input selecting at least one of the plurality of payment device rewards corresponding to the selected avatar.

12. The computer-implemented method of claim 1, further comprising:

displaying, with the at least one computing device and on the interactive graphical user interface, a plurality of add-on rewards different from the at least one payment device reward associated with the user;

receiving, with the interactive graphical user interface of the at least one computing device, a fourth user selection input selecting at least one add-on reward of the plurality of add-on rewards; and associating, with the at least one computing device, the at least one selected add-on reward with the user.

13. The computer-implemented method of claim 1, wherein the user data identifying the user comprises historical transaction data associated with the user, the computer-implemented method further comprising:

generating, with the at least one computing device, a recommendation for the user of the avatar and/or the at least one payment device reward based on the historical transaction data associated with the user; and displaying, with the at least one computing device and on the interactive graphical user interface, the recommendation of the avatar and/or the at least one payment device reward.

14. The computer-implemented method of claim 1, further comprising:

displaying, with the at least one computing device, a plurality of virtual environment design options, each virtual environment design option corresponding to a different virtual environment design;

receiving, with the at least one computing device, a fifth user selection input selecting a virtual environment design option of the plurality of virtual environment design options; and launching, with the at least one computing device, the virtual environment according the virtual environment design corresponding to the selected virtual environment design option.

15. The computer-implemented method of claim 1, wherein the virtual environment is launched in response to a user selecting an interactive element in at least one of a virtual gaming environment, virtual concert environment, and/or virtual shopping environment in which the user is immersed.

16. The computer-implemented method of claim 1, wherein the virtual environment is launched in response to a user engaging with the at least one computing device at a physical merchant location.

17. A system comprising at least one processor of at least one computing device of a user, programmed or configured to:

receive user data identifying the user;

launch a virtual environment configured to interact with the user, wherein launching the virtual environment comprises displaying an interactive graphical user interface of the at least one computing device, the interactive graphical user interface configured to receive user selection inputs;

in the virtual environment:

receive, with the interactive graphical user interface, a first user selection input selecting an avatar, the avatar corresponding to at least one payment device reward;

associate the avatar with the user;

associate the at least one payment device reward with the user;

display, on the interactive graphical user interface, a plurality of payment device design components;

receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, wherein the payment device issuance request contains at least one of the following: the user data, the first user selection input, the second user selection input, and/or any combination thereof.

18. The system of claim 17, wherein the at least one computing device comprises at least one of a smartphone, a desktop, a laptop, a virtual reality headset, a kiosk, and/or any combination thereof.

19. The system of claim 17, wherein the at least one computing device comprises a virtual reality headset wearable by the user, wherein the virtual reality headset is configured to detect a direction faced by the user such that a first region of the virtual environment is displayed on the interactive graphical user interface when the user faces a first direction and a second region of the virtual environment is displayed on the interactive graphical user interface when the user faces a second direction.

20. A computer program product comprising at least one non-transitory computer-readable medium including program instructions that, when executed by at least one processor of at least one computing device of a user, cause the at least one processor to:

receive user data identifying the user;

launch a virtual environment configured to interact with the user, wherein launching the virtual environment comprises displaying an interactive graphical user interface of the at least one computing device, the interactive graphical user interface configured to receive user selection inputs;

in the virtual environment:

receive, with the interactive graphical user interface, a first user selection input selecting an avatar, the avatar corresponding to at least one payment device reward;

associate the avatar with the user;

associate the at least one payment device reward with the user;

display, on the interactive graphical user interface, a plurality of payment device design components;

receive, with the interactive graphical user interface, a second user selection input selecting at least one of the plurality of payment device design components; and associate the at least one of the plurality of payment device design components with the user; and redirect the user to an issuer system by communicating a payment device issuance request to generate and issue a payment device to the user, wherein the payment device issuance request contains at least one of the following: the user data, the first user selection input, the second user selection input, and/or any combination thereof.

* * * * *